(12) United States Patent
Kidani et al.

(10) Patent No.: US 6,473,192 B1
(45) Date of Patent: Oct. 29, 2002

(54) JOB PROCESSING APPARATUS

(75) Inventors: Hideyuki Kidani; Hidetoshi Asasaka, both of Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/150,835

(22) Filed: Sep. 10, 1998

(30) Foreign Application Priority Data

Sep. 18, 1997 (JP) .............................................. 9-252945
Oct. 31, 1997 (JP) .............................................. 9-299247

(51) Int. Cl.⁷ .............................................. G06F 13/00
(52) U.S. Cl. ...................................... 358/1.14; 358/401
(58) Field of Search .............................. 358/1.14, 468, 358/401; 400/74

(56) References Cited

U.S. PATENT DOCUMENTS 3,993,303 A * 11/1976 Riedl et al. .................. 271/263
5,027,154 A * 6/1991 Ujiie et al. ................... 355/205
5,620,264 A * 4/1997 Kagita ........................... 400/74
5,943,503 A * 8/1999 Kai ............................. 395/839
6,000,865 A * 12/1999 Takamizawa et al. .......... 400/74
6,144,457 A * 11/2000 Higuchi ...................... 358/1.14

FOREIGN PATENT DOCUMENTS

| JP | 363159077 A | * | 7/1988 | ............. B41J/29/46 |
| JP | 5-188870 | * | 7/1993 | ............. G09F/9/00 |
| JP | 410324044 A | * | 12/1998 | ............. B41J/29/42 |
| JP | 2000062292 | * | 2/2000 | ............. B41J/29/38 |

* cited by examiner

*Primary Examiner*—Jerome Grant, II
(74) *Attorney, Agent, or Firm*—Fitzpatrick, Cella, Harper & Scinto

(57) ABSTRACT

During a printing operation an error is generated while receiving data from a processing apparatus. Even if different types of error are generated during processing of the received printing information, it is possible to provide a state of resuming reception of printing information from the data processing apparatus by executing error releasing processing corresponding to the type of the error.

20 Claims, 18 Drawing Sheets

FIG.3

| ERROR CODE | ERROR TITLE | ACTION CONTENTS | PERSON TO BE NOTIFIED |
|---|---|---|---|
| 00 | OFF-LINE | PROVIDE ON-LINE STATE WHEN OTHER ERROR IS NOT GENERATED. INITIALIZE INPUT/OUTPUT UNIT. | PRINTER CONTROLLER JOB OWNER |
| PC | CHANGE_TO_ XX SHEET | INTERRUPT CURRENT JOB. INITIALIZE INPUT BUFFER STORAGE, PAGE BUFFER STORAGE AND WORKING BUFFER STORAGE. | JOB OWNER |
| MF | XX MANUAL INSERTION | INTERRUPT CURRENT JOB. INITIALIZE INPUT BUFFER STORAGE, PAGE BUFFER STORAGE AND WORKING BUFFER STORAGE. | JOB OWNER |
| 21 | PRINTING_ OVERRUN | INTERRUPT CURRENT JOB. INITIALIZE INPUT BUFFER STORAGE, PAGE BUFFER STORAGE, WORKING BUFFER STORAGE, INPUT/OUTPUT UNIT AND PRINTING-UNIT I/F. | PRINTER CONTROLLER JOB OWNER |
| 22 | HAND_SHAKE_ ERROR | INTERRUPT CURRENT JOB. INITIALIZE INPUT BUFFER STORAGE AND INPUT/OUTPUT UNIT | PRINTER CONTROLLER JOB OWNER |
| 23 | DOWNLOAD MEMORY_FULL | INTERRUPT CURRENT JOB. INITIALIZE INPUT BUFFER STORAGE, PAGE BUFFER STORAGE, WORKING BUFFER STORAGE, INPUT/OUTPUT UNIT AND PRINTING-UNIT I/F. | PRINTER CONTROLLER JOB OWNER |
| 26 | SYSTEM MEMORY_FULL | INTERRUPT CURRENT JOB. INITIALIZE INPUT BUFFER STORAGE, PAGE BUFFER STORAGE, WORKING BUFFER STORAGE AND INPUT/OUTPUT UNIT. | PRINTER CONTROLLER JOB OWNER |
| 27 | IMAGE DATA MISMATCHING | INTERRUPT CURRENT JOB. INITIALIZE INPUT BUFFER STORAGE, PAGE BUFFER STORAGE, WORKING BUFFER STORAGE AND INPUT/OUTPUT UNIT. | JOB OWNER |
| 33 | WORKING MEMORY_FULL | INTERRUPT CURRENT JOB. INITIALIZE INPUT BUFFER STORAGE, PAGE BUFFER STORAGE, WORKING BUFFER STORAGE AND INPUT/OUTPUT UNIT. | PRINTER CONTROLLER JOB OWNER |
| F2 | FONT UNLOADED | INTERRUPT CURRENT JOB. INITIALIZE INPUT BUFFER STORAGE, PAGE BUFFER STORAGE, WORKING BUFFER STORAGE AND INPUT/OUTPUT UNIT. | PRINTER CONTROLLER JOB OWNER |

| ITEM NAME | VALUE |
|---|---|
| JOB TITLE | "nothing" (INITIAL VALUE) |
| JOB OWNER | "nothing" (INITIAL VALUE) |
| JOB TRANSMISSION PC | "nothing" (INITIAL VALUE) |
| JOB START TIME | "nothing" (INITIAL VALUE) |

| ITEM NAME | VALUE |
|---|---|
| ERROR CODE | NO INITIAL VALUE |
| ERROR TITLE | NO INITIAL VALUE |

FIG.6

PAGE PRINTER A123 JOB CANCEL INFORMATION PAGE

The processing of to following job has been interrupted because an error has been generated during printing processing.

| | |
|---|---|
| Job Title | XX-YYY : BUSINESS TRIP REPORT.DOC |
| Job Owner | Taro Tokkyo |
| Job Transmission PC | AAA BBB |
| Job Start Time | X:X, September 18, 1997 |
| Code of Generated Error | PC |
| Title of Generated Error | Change to the A3 sheet |

FIG.12

STORAGE MEDIUM, SUCH AS
FD, CD-ROM OR THE LIKE

| DIRECTORY INFORMATION |
|---|
| FIRST DATA PROCESSING PROGRAM<br>PROGRAM-CODE GROUP CORRESPONDING TO STEPS<br>OF FLOWCHART SHOWN IN FIG.6 |
| SECOND DATA PROCESSING PROGRAM<br>PROGRAM-CODE GROUP CORRESPONDING TO STEPS<br>OF FLOWCHART SHOWN IN FIG.7 |
| THIRD DATA PROCESSING PROGRAM<br>PROGRAM-CODE GROUP CORRESPONDING TO STEPS<br>OF FLOWCHART SHOWN IN FIG.8 |
| FOURTH DATA PROCESSING PROGRAM<br>PROGRAM-CODE GROUP CORRESPONDING TO STEPS<br>OF FLOWCHART SHOWN IN FIG.9 |
| FIFTH DATA PROCESSING PROGRAM<br>PROGRAM-CODE GROUP CORRESPONDING TO STEPS<br>OF FLOWCHART SHOWN IN FIG.10 |
| |

FIG.15

The sheets jammed. — E1

No sheets. — E2

The memory is full. — E3

The font is unloaded. — E4

FIG.22

STORAGE MEDIUM, SUCH AS
FD, CD-ROM OR THE LIKE

| DIRECTORY INFORMATION |
|---|
| FIRST DATA PROCESSING PROGRAM<br>PROGRAM-CODE GROUP CORRESPONDING TO STEPS<br>OF FLOWCHART SHOWN IN FIG.3 |
| SECOND DATA PROCESSING PROGRAM<br>PROGRAM-CODE GROUP CORRESPONDING TO STEPS<br>OF FLOWCHART SHOWN IN FIG.5 |
| THIRD DATA PROCESSING PROGRAM<br>PROGRAM-CODE GROUP CORRESPONDING TO STEPS<br>OF FLOWCHART SHOWN IN FIG.6 |
| FOURTH DATA PROCESSING PROGRAM<br>PROGRAM-CODE GROUP CORRESPONDING TO STEPS<br>OF FLOWCHART SHOWN IN FIG.7 |
| FIFTH DATA PROCESSING PROGRAM<br>PROGRAM-CODE GROUP CORRESPONDING TO STEPS<br>OF FLOWCHART SHOWN IN FIG.8 |
| SIXTH DATA PROCESSING PROGRAM<br>PROGRAM-CODE GROUP CORRESPONDING TO STEPS<br>OF FLOWCHART SHOWN IN FIG.10 |
| |

JOB PROCESSING APPARATUS

BACKGROUND OF THE INVENTION

1. Field of the Invention

The present invention relates to a printing control apparatus, paratus, a printing control method and a storage medium storing a program capable of being read by a computer, in which printing processing of a printing unit is controlled by analyzing printing information received from a data processing apparatus via a predetermined communication medium.

2. Description of the Related Art

Conventionally, in a printing system to which a printing control apparatus of this kind can be applied, when an error is generated during processing of received data, intervention of an operator is awaited by displaying an error state on a display unit of the printing apparatus, or printing processing is continued by automatically skipping the error by fault continuation means determined at each of processing steps, comprising input, development and output steps, when a preassigned time period has elapsed after the error state.

Since the conventional printing control apparatus is configured in the above-described manner, printing cannot be performed until an operator comes while displaying the error state. Accordingly, for example, when a printing apparatus is shared, continuously transmitted data cannot be processed, resulting in large delay in printing.

Even if error skip is automatically performed, normal printing is not guranteed because the basic cause of the error in printing data is not removed. Accordingly, for example, a disturbed image output is obtained in the case of an error in development, output using a sheet of an erroneous size may be obtained in the case of an error of no sheets, or output of blurred printing is obtained in the case of consumption of toner.

In the conventional printing apparatus, for example, when processing cannot be continued because, for example, there is no sheet to be fed, a normal printing result cannot be guaranteed due to an insufficient memory capacity, or an assigned font is not mounted, the apparatus shifts to an error state, where, for example, the operator's instruction of continuation/interruption of printing, or the operator's operation of setting sheets is awaited.

In such cases, even if a succeeding job is present and can be processed with no problem, the printing apparatus interrupts processing. Accordingly, all of succeeding jobs are made in a waiting state. Hence, particularly when the printing apparatus is used on a network by a plurality of users, it is very inconvenient to use th e apparatus.

For example, in a printer where only A4-size sheets are eset, if a job J1 requiring A3-size sheets and a job J2 requiring A4-size sheets are spooled and processed in this sequence, an error requesting A3-size sheets to the operator is generated because the job J1 cannot be processed, and the process is interrupted.

In this case, although the spooled job J2 can be processed with no problem, the processing of the job J2 is held until the error due to the job J1 is released.

SUMMARY OF THE INVENTION

It is an object of the present invention to solve the above-described problems.

It is another object of the present invention to provide a printing control apparatus, a printing control method and a storage medium storing a program capable of being read by a computer, in which when an error is generated during processing of printing information received from a data processing apparatus or each of data processing apparatuses, printing information is received from the data processing apparatus, serving as the source of transfer of the printing information, by releasing the error or notifying the data processing apparatus of information indicating cancel of a printing job. Even if each kind of error is generated during processing of the, received printing information, it is possible to provide a state of resuming reception of printing information from the data processing apparatus by executing error releasing processing corresponding to the type of the error. Hence, it is possible to shorten the time required for providing the data processing apparatus with a printable state, to reduce burden in error releasing processing, and to prevent stagnation of the succeeding printing job from the data processing apparatus.

It is still another object of the present invention to provide a printing control apparatus, a data processing method for a printing control apparatus, a printing control system, a data processing method for a printing control system, and a storage medium storing a program capable of being read by a computer, in which even when a cause to interrupt printing is generated during processing of a preceding job, if the cause is a cause to interrupt printing which does not hinder execution of the succeeding job, succeeding jobs are preferentially and sequentially executed. Hence, even if a cause to interrupt printing is generated while executing jobs received in advance, succeeding jobs capable of being processed are sequentially processed in accordance with the cause to interrupt printing. As a result, succeeding jobs can be efficiently processed by preventing a state in which all of succeeding jobs are held due to a cause to interrupt printing peculiar to the preceding job.

According to one aspect, the present invention which achieves these objectives relates to a printing control apparatus capable of communicating with a data processing apparatus via a predetermined communication medium. The printing control apparatus includes detection means for detecting an error for a printing job based on printing information received from the data processing apparatus, determination means for determining a type of the error detected by the detection means, releasing means for executing error releasing processing based on the type of the error determined by the determination means, and control means for cancelling the printing job after the error releasing processing by the releasing means.

In an embodiment, the control means notifies a source of transfer of the printing information of information relating to the cancel of the printing job.

In another embodiment, the control means notifies a source of transfer of the printing information of the type of the error determined by the determination means.

In still another embodiment, the printing control apparatus further includes first setting means for setting a time-out value for performing notification of the type of the error. When a time period after the detection means has detected the error exceeds the time-out value set by the first setting means, the control means notifies a source of transfer of the printing information of the type of the error determined by the determination means.

In still another embodiment, the printing control apparatus further includes second setting means for setting a time-out value for performing notification of cancel information. When a time period after the detection means has detected the error exceeds the time-out value set by the second setting means, the control means notifies a source of transfer of the printing information of information relating to the cancel of the printing job.

According to another aspect, the present invention which achieves these objectives relates to a printing control apparatus capable of communicating with a plurality of data processing apparatuses via a predetermined communication medium. The printing control apparatus includes detection means for detecting an error for a printing job based on printing information received from one of the data processing apparatuses, determination means for determining a type of the error detected by the detection means, releasing means for executing error releasing processing based on the type of the error determined by the determination means, and control means for cancelling the printing job after the error releasing processing by the releasing means.

In an embodiment, the control means notifies one of the data processing apparatuses of Information relating to the cancel of the printing job by identifying an apparatus where the printing information is to be notified.

In another embodiment, the control means notifies one of the data processing apparatuses of the type of the error determined by the determination means by identifying an apparatus where the printing information is to be notified.

In still another embodiment, the printing control apparatus further includes first setting means for setting a time-out value for performing notification of the type of the error. When a time period after the detection means has detected the error exceeds the time-out Value set by the first setting means, the control means notifies one of the data processing apparatus of the type of the error determined by the determination means by identifying an apparatus where the printing information is to be notified.

In still another embodiment, the printing control apparatus further includes second setting means for setting a time-out value for performing notification of cancel information. When a time period after the detection means has detected the error exceeds the time-out value set by the second setting means, the detection means notifies one of the data processing apparatuses of information relating to the cancel of the printing job by identifying an apparatus where the printing information is to be notified.

According to still another aspect, the present invention which achieves these objectives relates to a printing control method for controlling a process of printing printing information received by communicating with a data processing apparatus via a predetermined communication medium. The method includes the steps of detecting an error for a printing job based on printing information received from the data processing apparatus, determining a type of the error detected in the detecting step, executing error releasing processing based on the type of the error determined in the determining step, notifying a source of transfer of the printing information of the type of the error determined in the determining step, cancelling the printing job after the error releasing processing in the releasing step, and notifying the source of transfer of the printing information of information relating to the cancel in the cancelling step.

According to still another aspect, the present invention which achieves these objectives relates to a printing control method for controlling processing of printing printing information received by communicating with a plurality of data processing apparatuses; via a predetermined communication medium. The method includes the steps of detecting an error for a printing job based on printing information received from one of the data processing apparatuses, determining a type of the error detected in the detecting step, executing error releasing Processing based on the type of the error determined in the determining step, notifying a source of transfer of the printing information of the type of the error determined in the determining step, cancelling the printing job after the error releasing processing in the releasing step, and notifying one of the data processing apparatuses of information relating to the cancel in the cancelling step.

According to still another aspect, the present invention which achieves these objectives relates to a storage medium storing a program capable of being read by a computer for controlling a process of printing printing information received by communicating with a data processing apparatus via a predetermined communication medium. The program includes the steps of detecting an error for a printing job based on printing information received from the data processing apparatus, determining a type of the error detected in the detecting step, executing error releasing processing based on the type of the error determined in the determining step, notifying a source of transfer of the printing information of the type of the error determined in the determining step, cancelling, the printing job after the error releasing processing in the releasing step, and notifying the source of transfer of the printing information of information relating to the cancel in the cancelling step.

According to still another aspect, the present invention which achieves these objectives relates to a storage medium storing a program capable of being read by a computer for controlling processing of printing printing information received by communicating with a plurality of data processing apparatuses via a predetermined communication medium. The program includes the steps of detecting an error for a printing job based on printing information received from one of the data processing apparatuses, determining a type of the error detected in the detecting step, executing error releasing processing based on the type of the error determined in the determining step, notifying a source of transfer of the printing information of the type of the error determined in the determining step, cancelling the printing job after the error releasing processing in the releasing step, and notifying one of the data processing apparatuses of information relating to the cancel in the cancelling step.

According to still another aspect, the present invention which achieves these objectives relates to a printing control apparatus capable of performing printing processing by sequentially spooling printing data received from a data processing apparatus via a predetermined communication medium in units of a job, and analyzing the spooled printing data in units of a job. The printing control apparatus includes storage means for spooling the printing data in a memory, and control means for changing, when printing processing is interrupted during processing of printing printing data which has been spooled in advance, an execution schedule of each spooled job so as to preferentially execute a job of spooled printing data capable of being printed by analyzing a cause of interruption of printing.

According to still another aspect, the present invention which achieves these objectives relates to a printing control apparatus capable of performing printing processing by sequentially spooling printing data received from a data processing apparatus via a predetermined communication medium in units of a job, and analyzing the spooled printing data in units of a job. The printing control apparatus includes assigning means for assigning a time-out time from generation of a cause to interrupt printing of a job being subjected to printing processing until start of printing processing of a succeeding job, time counting means for counting the time-out time assigned by the assigning means from the generation of a cause to interrupt printing of a job being subjected to printing processing, and job control means for causing sequential processing of spooled succeeding jobs when the time counting means has counted the time-out time.

In an embodiment, the printing control apparatus further includes determination means for determining if a type of the generated cause to interrupt printing of the job being subjected to printing processing is a cause peculiar to the job. When the determination means has determined that the type of the generated cause to interrupt printing of the job being subjected to printing processing is a cause peculiar to the job, and the time counting means has completed the counting of the assigned time-out time, the job control means causes preferential sequential processing of spooled succeeding jobs.

In an embodiment, the cause peculiar to the job is a printing control command which originates from a state of insufficiency of printing resources or which cannot be processed.

In another embodiment, the printing resources include font resources, recording-medium resources and memory resources, and the printing command which cannot be processed includes a printing command for image data.

In still another embodiments, the printing control apparatus further includes page determination means for determining if a page where the cause to interrupt printing of the job being subjected to printing processing is generated is a leading page in printing data. When the page determination means has determined that the page where the cause to interrupt printing of the job being subjected to printing processing is a leading page in the printing data, the time counting means starts counting of the time-out time.

In still another embodiment, the printing control apparatus further includes spool determination means for determining if a succeeding job is spooled when the cause to interrupt printing of the job being subjected to printing processing is generated. When the spool determination means has determined that the succeeding job is spooled, the time counting means starts counting of the time-out time.

In still another embodiment, the job control means performs sequential processing by replacing the interrupted job with the spooled succeeding job.

In still another embodiment, the job control means performs sequential processing by rearranging succeeding jobs so that the interrupted job is the last job in the spooled succeeding jobs.

In still another embodiment, the printing control apparatus further includes spool determination means for determining if a succeeding job is spooled when the cause to interrupt printing of the job being subjected to printing processing is generated. When the spool determination means has determined that the succeeding job is not spooled, the job control means causes processing of the interrupted job.

In still another embodiments, the printing control apparatus further includes storage means for storing the cause to interrupt printing of the job generated during the printing processing, and release determination means for determining if the cause to interrupt printing stored in the storage means is released, at every processing of the succeeding job. When the release determination means has determined that the cause to interrupt printing stored in the storage means is released, the job control means causes processing of the interrupted job.

According to still another aspect, the present invention which achieves these objectives relates to a data processing method for a printing control apparatus capable of performing printing processing by sequentially spooling printing data received from a data processing apparatus via a predetermined communication medium in units of a job, and analyzing the spooled printing data in units of a job. The method includes the steps of counting a time-out time from generation of a cause to interrupt printing of a job being subjected to printing processing until printing processing of a succeeding job is started, and causing preferential sequential processing of spooled succeeding jobs after the counting of the time-out time has been completed in the counting step.

In an embodiment, the method further includes the step of determining if a page where the cause to interrupt printing of the job being subjected to printing processing is generated is a leading page in the printing data. When the page determining step has determined that the page where the cause to interrupt printing of the job being subjected to printing processing is a leading page in the printing data, the time counting step starts counting of the time-out time.

In another embodiment, the method further includes the step of determining if a succeeding job is spooled when the cause to interrupt printing of the job being subjected to printing processing is generated. When the spool determining step has determined that the succeeding job is spooled, the time counting step starts counting of the time-out time.

In still another embodiment, the job controlling step causes sequential processing by replacing the interrupted job with the spooled succeeding job.

In still another embodiment, the job controlling step causes sequential processing by rearranging succeeding jobs so that the interrupted job is the last job in the spooled succeeding jobs.

In still another embodiment, the method further includes the step of determining if a succeeding job is spooled when the cause to interrupt printing of the job being subjected to printing processing is generated. When the spool determining step has determined that the succeeding job is not spooled, the job controlling step causes processing of the interrupted job.

According to still another aspect, the present invention which achieves these objectives relates to a storage medium storing a program capable of being read by a computer for controlling a printing apparatus capable of performing printing processing by sequentially spooling printing data received from a data processing apparatus via a predetermined communication medium in units of a job, and analyzing the spooled printing data in units of a job. The program includes the steps of counting a time-out time from generation of a cause to interrupt printing of a job being subjected to printing processing until processing of printing a succeeding job is started, and causing preferential sequential processing of spooled succeeding jobs after the counting of the time-out time has been completed in the counting step.

In an embodiment, the program further includes the step of determining if a page where the cause to interrupt printing of the job being subjected to printing processing is generated is a leading page in the printing data. When the page determining step has determined that the page where the cause to interrupt printing of the job being subjected to printing processing is a leading page in the printing data, the time counting step starts counting of the time-out time.

In another embodiment, the program further includes the step of determining if a succeeding job is spooled when the cause to interrupt printing of the job being subjected to printing processing is generated When the spool determining step has determined that the succeeding job is spooled, the time counting step starts counting of the time-out time.

In still another embodiment, the job controlling step causes sequential processing by replacing the interrupted job with the spooled succeeding job.

In still another embodiment, the job controlling step causes sequential processing by rearranging succeeding jobs so that the interrupted job is the last job in the spooled succeeding jobs.

In still another embodiment, the program further includes the step of determining if a succeeding job is spooled when the cause to interrupt printing of the job being subjected to printing processing is generated. When the spool determining step has determined that the succeeding job is not spooled, the job controlling step causes processing of the interrupted job.

According to still another aspect, the present invention which achieves these objectives relates to a printing control system capable of performing printing processing in which a server sequentially spools printing data received from a data processing apparatus via a predetermined communication medium in units of a job and transfers the spooled printing data to a printing apparatus, and the transferred printing data is analyzed in units of a job. The system includes a server for spooling the printing data, and control means for changing, when it is detected that the printing apparatus has interrupted printing processing during processing of printing printing data spooled in advance in the server, an execution schedule of each spooled job so as to preferentially execute a job of printing data being spooled and capable of being printed by analyzing a cause to interrupt printing.

According to still another aspect, the present invention which achieves these objectives relates to a data processing method for a printing control system capable of performing printing processing in which a server sequentially spools printing data received from a data processing apparatus via a predetermined communication medium in units of a job and transfers the spooled printing data to a printing apparatus, and the transferred printing data is analyzed in units of a job. The method includes the step of changing, when it is detected that the printing apparatus has interrupted printing processing during processing of printing printing data spooled in advance in the server, an execution schedule of each spooled job so as to preferentially execute a job of printing data being spooled and capable of being printed by analyzing a cause to interrupt printing.

According to still another aspect, the present invention which achieves these objectives relates to a storage medium storing a program capable of being read by a computer for controlling a printing control system capable of performing printing processing in which a server sequentially spools printing data received from a data processing apparatus via a predetermined communication medium in units of a job and transfers the spooled printing data to a printing apparatus, and the transferred printing data is analyzed in units of a job. The program includes the step of changing, when it is detected that the printing apparatus has interrupted printing processing during processing of printing printing data spooled in advance in the server, an execution schedule of each spooled job so as to preferentially execute a job of printing data being spooled and capable of being printed by analyzing a cause to interrupt printing.

The foregoing and other objects, advantages and features of the present invention will become more apparent from the following description of the preferred embodiments taken in conjunction with the accompanying drawings.

BRIEF DESCRIPTION OF THE DRAWINGS

FIG. 3 is a diagram illustrating the configuration of an error detail table (EDTBL) secured in a ROM (read-only memory) shown in FIG. 2;

FIG. 4 is a diagram illustrating the configuration of a job-information area (JI) in a RAM (random access memory) shown in FIG. 2;

FIG. 5 is a diagram illustrating the configuration of an error-information area (EI) in the RAM shown in FIG. 2;

FIG. 6 is a diagram illustrating an output sample of a job cancel information page printed from a printing unit shown in FIG. 2;

FIG. 12 is a diagram illustrating a memory map of a storage medium storing various data processing programs which can be read in a printing system according to a fourth embodiment of the present invention;

FIG. 15 is a diagram illustrating examples of error messages displayed on an LCD (liquid-crystal display) on an operation panel shown in FIG. 1;

FIG. 22 is a diagram illustrating a memory map of a storage medium storing various data processing programs which can be read in a printing system to which a data processing apparatus according to the present invention can be applied.

DESCRIPTION OF THE PREFERRED EMBODIMENTS

A description will now be provided of a case in which the present invention is applied to a laser-beam printer (hereinafter abbreviated as an "LBP"), which will be described in detail with reference to the drawings.

Before describing the configuration of the present invention, the configuration of the LBP will be described with reference to FIG. 1.

Figure 1:
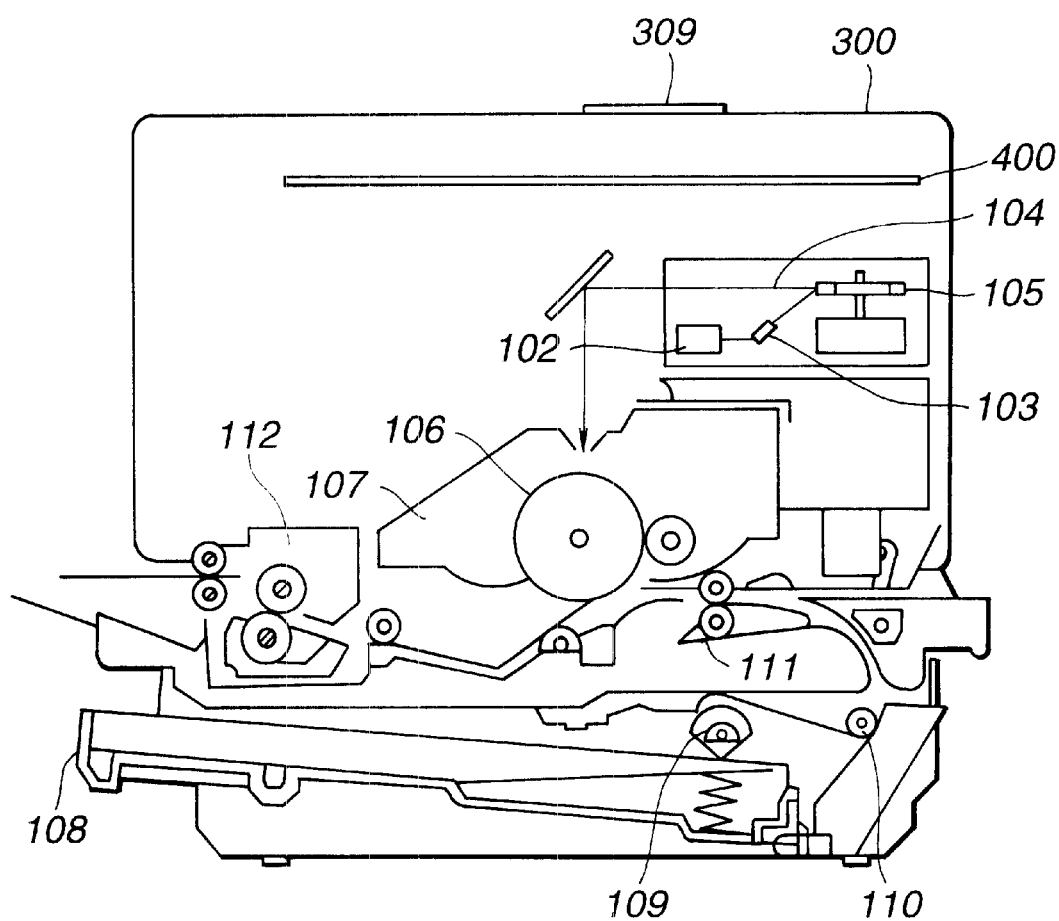
FIG. 1 is a diagram illustrating the configuration of a laser-beam printer (LBP) to which the present invention is applied.

FIG. 1 is a cross-sectional view illustrating the configuration of a printing apparatus to which a printing control apparatus according to the present invention can be applied. The printing apparatus corresponds, for example, to the LBP. The LBP is configured so that character patterns, form data (indicating a document format) and the like can be registered from a host computer which is connected to the LBP as a data source.

In FIG. 1, an LBP main body 300 receives and stores character information (character codes), form information, macrocommands and the like supplied from a host computer (represented by reference numeral 100 in FIG. 2) connected to the LBP main body 300, forms character patterns, a form pattern and the like in accordance with the received information, and forms an image on a recording sheet, serving as a recording medium. An operation panel 309 includes, for example, switches for operations, an LED (light-emitting diode) display unit, an LCD or the like for displaying the state of the printer. A printer control unit (printer controller) 400 controls the entire LBP main body 300, and analyzes character information and the like supplied from the host computer 100.

The printer control unit 400 mainly converts character information into a video signal representing corresponding character patterns, and outputs the video signal to a laser driver 102.

The laser driver 102 is a circuit for driving a semiconductor laser 103, and performs on-off switching of a laser beam 104 emitted from the semiconductor laser 103 in accordance with the input video signal. The laser beam 104 scans the surface of an electrostatic drum 106 by being deflected in a direction perpendicular to the plane of FIG. 1 by a rotating polygonal mirror 105. An electrostatic latent image of character patterns is thereby formed on the electrostatic drum 106.

This latent image is developed by a developing unit (toner cartridge) 107 provided around the electrostatic drum 106, and the developed image is transferred onto a recording sheet. A cut sheet is used as the recording sheet. Cut recording sheets are accommodated in a sheet cassette 108 mounted in the LBP. Each of the recording sheets is taken into the LBP by a sheet feeding roller 109, a conveying roller 110 and a pair of conveying rollers 111, and is supplied to the electrostatic drum 106.

A fixing unit 112 fixes toner (powder ink) transferred on the recording sheet thereon using heat and pressure.

First Embodiment

Figure 2:
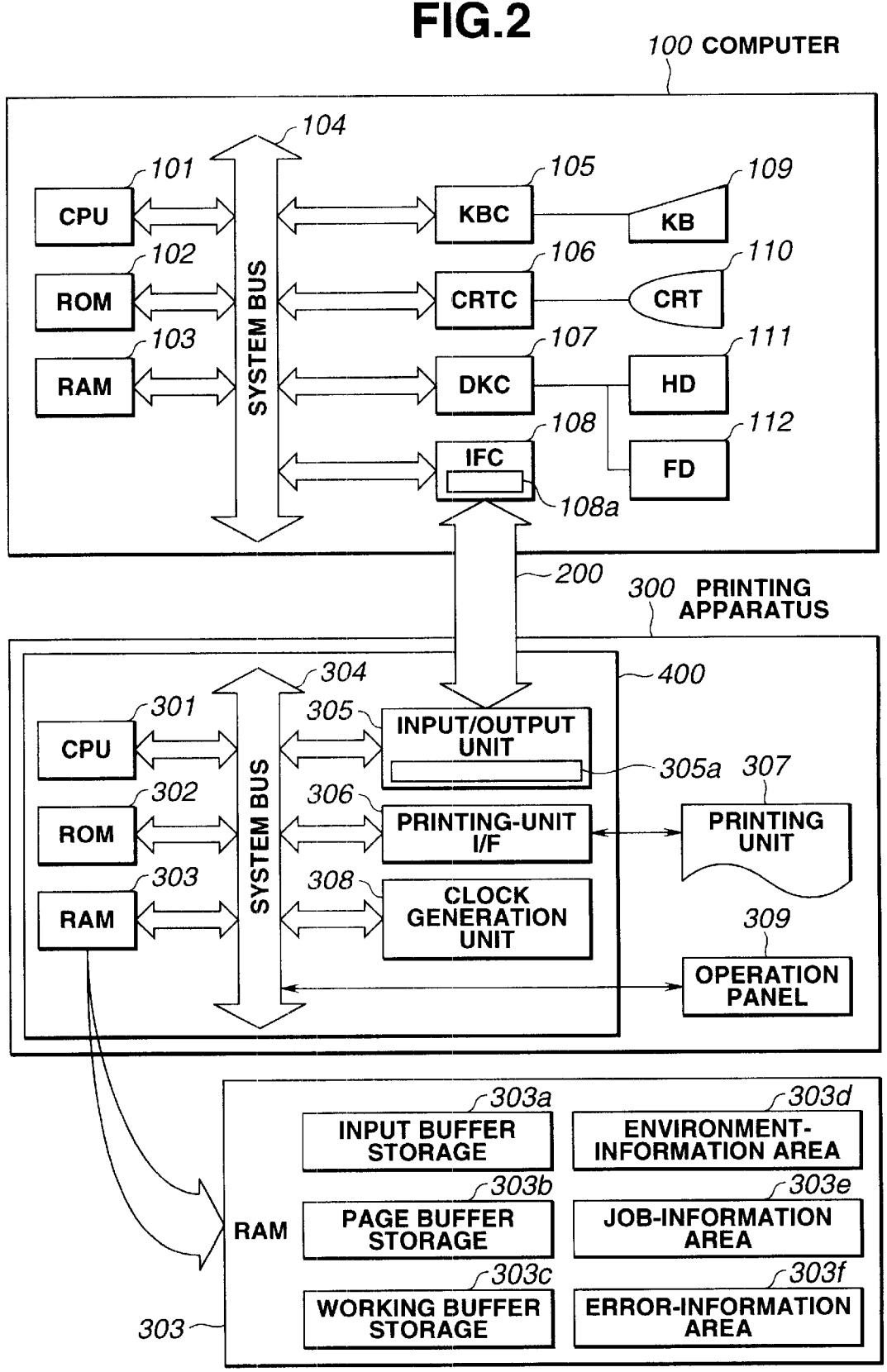
FIG. 2 is a block diagram illustrating the configuration of control in a printing system to which a printing control apparatus according to a first embodiment of the present invention can be applied.

FIG. 2 is a block diagram illustrating the configuration of control of a printing system to which a printing control apparatus according to a first embodiment of the present invention can be applied.

In FIG. 2, the computer 100 includes a CPU (central processing unit) 101 for executing processing of documents having figures, images, characters, tables and the like based on a document processing program stored in a ROM 102.

The CPU 101 controls respective devices connected to a system bus 104.

A RAM 103 operates as a main memory, working areas and the like for the CPU 101. A CRT controller (CRTC) 106 controls display of a CRT display (CRT) 106. A disk controller (DKC) 107 controls access to a hard disk (HD) 111 and to a floppy disk (FD) 112 for storing boot programs, various application programs, font data, user files and the like. A keyboard controller (KBC) 105 controls key input from a keyboard (KB) 109.

An interface controller (IFC) 108 executes communication control processing with a printing apparatus 300 via a predetermined two-way interface (hereinafter abbreviated as an "interface") 200. Interface circuits 108a and 305a control various kinds of data communication processing with the printing apparatus 300 and the computer 100 via the interface 200.

In the printing apparatus 300, a CPU 301 outputs an image signal, serving as printing data, to a printing unit (engine) 307 connected via a printing-unit I/F (interface) 306 based on a control program or the like stored in a ROM 302. The ROM 302 stores table information shown in FIG. 3, control programs for the CPU 301 as shown in the flowcharts of FIGS. 7–11, and the like.

The CPU 301 can perform communication processing with the computer 100 via an input/output unit 305, and is configured so as to be able to notify the computer 100 of job information, error information and the like stored in a RAM 303.

The RAM 303 operates as a main memory, working areas and the like for the CPU 301, and is used as an input buffer storage 303a, a page buffer storage 303b, a working buffer storage 303c, an environment-information area 303d, a job-information area (JI) 303e, an error-information area (EI) 303f and the like.

The RAM 303 can hold a part of information (in a NV(nonvolatile)RAM region) using a dedicated battery even if the power supply of the printing apparatus 300 is turned off. Values in a "transmission destination" item of an error detail table (EDTBL), time-out values within the environment-information area 303d, whether or not automatic error skipping is to be used, and the like are stored in the NVRAM region.

A clock generation unit 308 generates an internal clock signal which is to be referred to particularly in time processing in internal processing of the printing apparatus. An operation panel 309 includes operation buttons for operating the printing apparatus 300, and a display unit for displaying the operational state. Reference numeral 400 represents a printer controller.

FIG. 3 is a diagram illustrating the configuration of the error detail table (EDTBL) secured in the ROM 302 shown in FIG. 2. The error detail table includes "error code", "error title", "action contents" and "person to be notified" items, and is configured by making the error code a key. Values in the "person to be notified" item can be reset. When setting of a value is changed, the set value is stored in the environment-information area 303d in the RAM 303.

FIG. 4 is a diagram illustrating the configuration of the job-information area (JI) 303e of the RAM 303 shown in FIG. 2. The job-information area (JI) 303e is configured by items including "job title", "job owner", "job transmission PC" and "job start time". A word "nothing" is stored in each item as an initial value.

FIG. 5 is a diagram illustrating the configuration of the error-information area (EI) 303f of the RAM 303 shown in FIG. 2. The error-information area (EI) 303f is configured by items "error code" and "error title".

FIG. 6 is a diagram illustrating an output sample of a job cancel information page printed from the printing unit 307. The values in the job-information area (JI) and the error-information area (EI) are printed in the output sample.

The characteristic configuration of the first embodiment will now be described with reference to FIG. 2 and others.

The printing control apparatus (printer controller 400) which can communicate with the data processing apparatus (computer 100) via the predetermined communication medium (interface 305a) and which is configured in the above-described manner includes a detection unit for detecting an error for a printing job based on printing information received from the data processing apparatus (the CPU 301 performs detection processing by executing a control program stored in the ROM 302 or memory resources (not shown)), a determination unit for determining a type of the error detected by the detection unit (the CPU 301 performs detection processing by executing a control program stored in the ROM 302 or memory resources (not shown)), a releasing unit for executing error releasing processing based on the type of the error determined by the determination unit (the CPU 301 performs releasing processing (corresponding to the action contents shown in FIG. 3) by executing a control program stored in the ROM 302 or memory resources (not shown)), and a control unit for cancelling the printing job after the error releasing processing by the releasing unit (the CPU 301 performs control by executing a control program stored in the ROM 302 or memory resources (not shown)). Hence, even if an error of each type is generated during processing of printing information received from the data processing apparatus, it is possible to execute error releasing processing corresponding to the type of the error, and to prevent stagnation of succeeding printing jobs by providing a state in which printing information can be received.

The CPU 301 notifies a source of transfer of the printing information of information relating to the cancel of the printing job (data having the contents shown in FIG. 6). Hence, the user can easily confirm the contents of the job cancelled at the source of transfer of the printing information.

The CPU 301 also notifies the source of transfer of the printing information of the determined type of the error (corresponding to the error code shown in FIG. 3). Hence, the user can promptly perform an optimum action corresponding to the cause of the generated error for the printing apparatus by confirming the contents of the error generated at the source of transfer of the printing information.

The printing control apparatus also includes a first setting unit for setting a time-out value for notifying the type of the error (set by a command based on an input from the operation panel 309 or by setting for a printing setting picture surface of the computer 100), and the CPU 301 notifies a source of transfer of the printing information of the determined type of the error (corresponding to the error code shown in FIG. 3) when the time period after detecting the error exceeds the set time-out value. Hence, when an error having an elapsed time period exceeding the time-out value is generated, the type of the error can be assuredly notified to the user at the source of transfer of the printing information.

The printing control apparatus also includes a second setting unit for setting a time-out value for notifying the cancel information (set by a command based on an input from the operation panel 309 or by setting for a printing setting picture surface of the computer 100), and the CPU 301 notifies the source of transfer of the printing information of information relating to the cancel of the printing job (data having the contents shown in FIG. 6) when the time period after detecting the error exceeds the set time-out value (the CPU 301 performs control processing by executing a control program stored in the ROM 302 or memory resources (not shown)). Hence, when an error having an elapsed time period exceeding the time-out value is generated, the cancel information can be assuredly notified to the user at the source of transfer of the printing information.

The printing control apparatus (printer controller 400) which can communicate with a plurality of data processing apparatuses (a plurality of computers (not shown) including the computer 100) via a predetermined communication medium (a network utilizing various protocols) includes a detection unit for detecting an error for a printing job based on printing information received from one of the data processing apparatuses (the CPU 301 performs detection processing by executing a control program stored in the ROM 302 or memory resources (not shown)), a determination unit for determining a type of the error detected by the detection unit (the CPU 301 performs detection processing by executing a control program stored in the ROM 302 or memory resources (not shown)), a releasing unit for executing error releasing processing based on the type of the error determined by the determination unit (the CPU 301 performs releasing processing by executing a control program stored in the ROM 302 or memory resources (not shown)), and a control unit for cancelling the printing job after the error releasing processing by the releasing unit (the CPU 301 performs control processing by executing a control program stored in the ROM 302 or memory resoueces (not shown)). Hence, even if printing information is received from one of the data processing apparatuses and an error of each type generated during processing of the printing information, it is possible to execute error releasing processing corresponding to the type of the error, to provide a state in which printing information from other data processing apparatuses can be received, to shorten the time period required until each data processing apparatus assumes a printable state, to reduce burden on error releasing processing, and to prevent stagnation of succeeding printing jobs from each data processing apparatus.

The CPU 301 notifies one of the data processing apparatuses of information relating to the cancel of the printing job by identifying an apparatus where the printing information is to be notified (job-cancel information corresponding to the contents shown in FIG. 6). Hence, the user can easily confirm the contents of the job cancelled at the source of transfer of the printing information.

The CPU 301 also notifies one of the data processing apparatuses of the determined type of the error by identifying an apparatus where the printing information is to be notified-Hence, the user can promptly perform an optimum action corresponding to the cause of the generated error for the printing apparatus by confirming the contents of the error generated at the source of transfer of the printing information.

The printing control apparatus also includes a first setting unit for setting a time-out value for notifying the type of the error (set by a command based on an input from the operation panel 309 or by setting for a printing setting picture surface of the computer 100), and the CPU 301 notifies one of the data processing apparatuses of the determined type of the error by identifying an apparatus where the printing information is to be notified, when the time period after detecting the error exceeds the set time-out value. Hence, when an error having an elapsed time period exceeding the time-out value is generated, the type of the error can be assuredly notified to the user at the source of transfer of the printing information.

The printing control apparatus also includes a second setting unit for setting a time-out value for notifying the cancel information (set by a command based on an input from the operation panel 309 or by setting for a printing setting picture surface of the computer 100), and the CPU 301 notifies one of the data processing apparatuses of information relating to the cancel of the printing job by identifying an apparatus where the printing information is to be notified, when the time period after detecting the error exceeds the set time-out value. Hence, when an error having an elapsed time period exceeding the time-out value is generated, the cancel information can be assuredly notified to the user at the source of transfer of the printing information.

Figure 7:
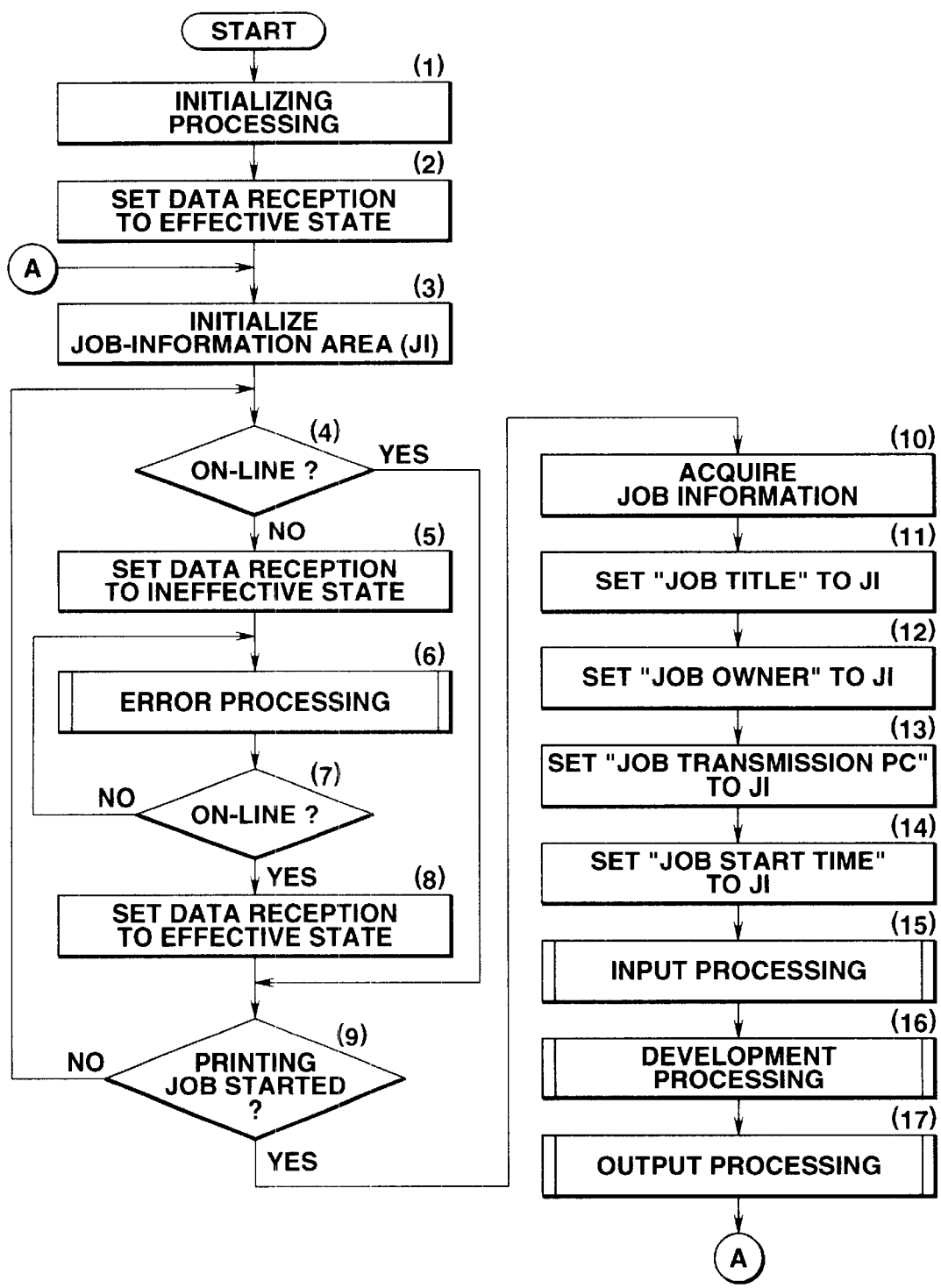
FIG. 7 is a flowchart illustrating a first data processing procedure in the printing control apparatus shown in FIG. 2.

FIG. 7 is a flowchart illustrating a first data processing procedure in the printing control apparatus of the invention. Numerals (1)–(17) represent respective steps.

In step (1), initializing processing is executed immediately after turning on the power supply of the printing apparatus 300. In this processing, for example, a main program stored in the ROM 302 is read, the input buffer storage 303a, the page buffer storage 303b and the working buffer storage 303c are cleared, the setting value in the environment-information area 303d is read, and the input/output unit 305, the printing unit 307 and the operation panel are initialized.

Then, in step (2), data transmission/reception of the input/output unit 305 is set to an effective state. In step (3), the job-information area (JI) 303e is initialized at every end of a job and error processing.

Then, in step (4), it is determined if the printing apparatus 300 is in an on-line state. If the result of the determination in step (4) is affirmative, the process jumps to step (9). If the result of the determination in step (4) is negative, data transmission/reception of the input/output unit 305 is set to an ineffective state.

Then, in step (6), the process jumps to error processing shown in FIG. 8 (to be described later). In step (7), it is determined if the printing apparatus 300 is in an on-line state. If the result of the determination in step (7) is affirmative, the process proceeds to step (8). If the result of the determination in step (7) is negative, the process returns to step (6), and the same processing is repeated.

Then, in step (8), data transmission/reception of the input/output unit 305 is set to an effective state. In step (9), it is determined if a printing job has been started, i.e., for example, if the input/output unit 305 has received data, or if an instruction to perform test printing of the printer, or the like has been transmitted from the operation panel 309. If the result of the determination in step (9) is negative, the process returns to step (4), and the processing is repeated until a job is started. If the result of the determination in step (9) is affirmative, the process proceeds to step (10), where information relating to the started job is acquired from printing data, the computer 100 or the like. In steps (11)–(14), the acquired "job-title information", "job-owner information", "job-transmission information" and "job-start-time information" are set in "job title", "job owner", "job transmission PC" and "job start time" items of the job-information area (JI) 303e, respectively.

Then, in step (15), the process jumps to input processing shown in FIG. 9 (to be described later). In step (16), the process jumps to development processing shown in FIG. 10 (to be described later). In step (17), the process jumps to output processing shown in FIG. 11 (to be described later).

Upon completion of a series of jump processing, the process returns to step (3), and the same processing is repeated.

In the flowchart shown in FIG. 7, the processing of steps (4)–(9) is performed in order to always keep the printing apparatus in an on-line state in a state of awaiting reception.

Next, the error processing will be described with reference to the flowchart shown in FIG. 8.

Figure 8:
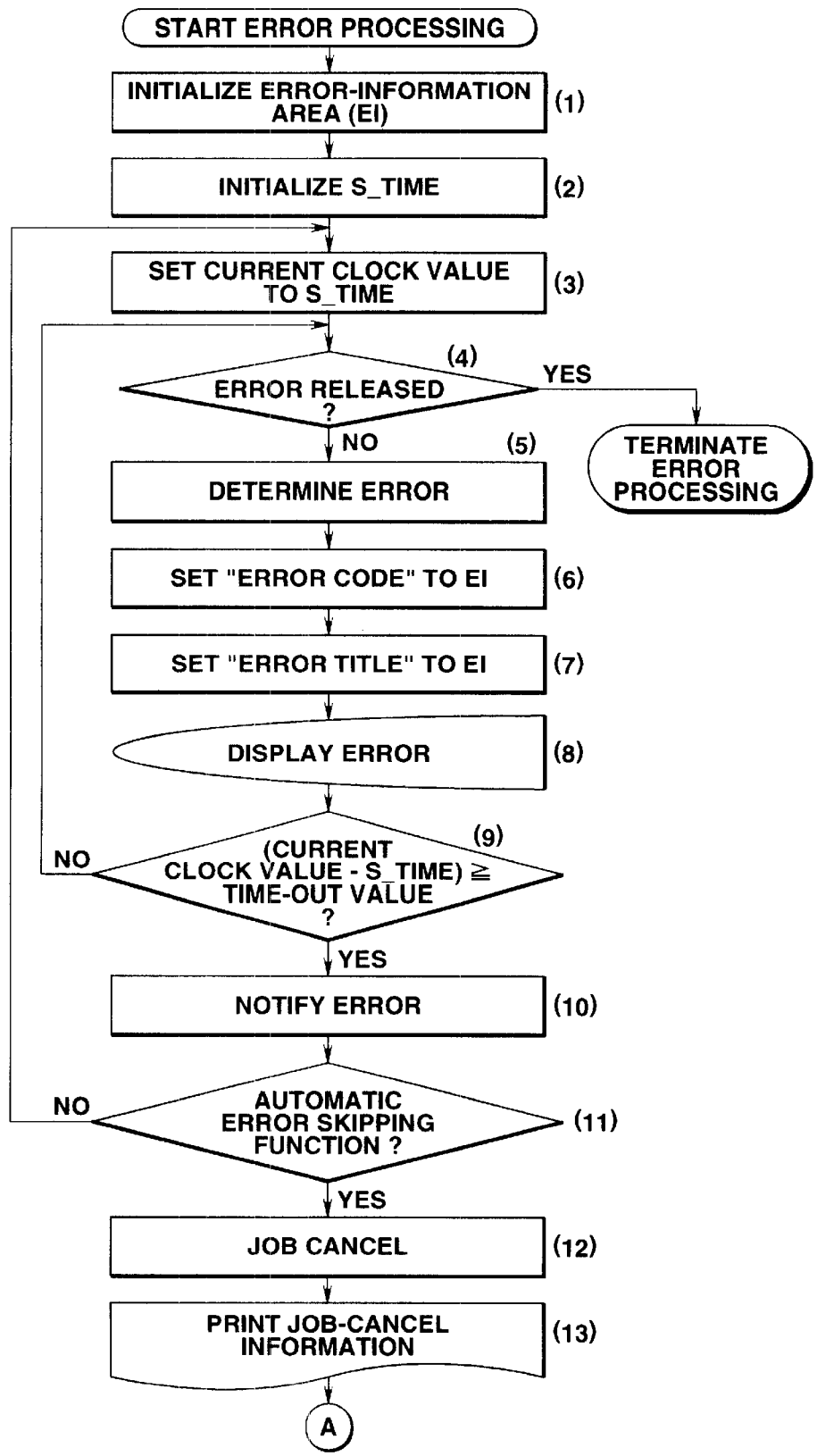
FIG. 8 is a flowchart illustrating a second data processing procedure in the printing control apparatus shown in FIG. 2.

FIG. 8 is a flowchart illustrating a second data processing procedure in the printing control apparatus of the invention. This flowchart corresponds to the detailed procedure of the error processing shown in FIG. 7. Numerals (1)–(13) represents respective steps.

First, in step (1), the error-information area (EI) 303f is cleared. In step (2), a variable (S_TIME) for preserving the clock value is initialized. In step (3), the clock value from the clock generation unit 308 when executing step (3) is set to the variable S_TIME. This variable S_TIME is stored in the RAM 303.

Then, in step (4), it is determined if the error state of the printing apparatus 300 is released. If the result of the determination in step (4) is affirmative, the error processing is terminated, and the process returns to the original error processing before jumping. If the result of the determination in step (4) is negative, the process proceeds to step (5).

In step (5), the code of the concerned error is determined based on the state of the currrently generated error. In step (6), the error code (see FIG. 3) determined in step (5) is set in the "error code" item of the error-information area 303f. Then, in step (7), the value of the "error title" item in the error detail table (EDTBL) making the error code determined in step (5) a key is set in the "error title" item in the error-information area (EI) 303f.

In step (8), the values of the "error code" and the "error title" items in the error-information area (EI) 303f are displayed on the operation panel 309. Then, in step (9), the value of the variable S_TIME is subtracted from the clock value of the clock generation unit 308 during execution of step (9), and it is determined if the resultant value is equal to or larger than the time-out value stored in the environment-information area 303d. If the result of the determination in step (9) is negative, the process returns to step (4). If the result of the determination in step (9) is affirmative, the process proceeds to step (10). The time-out value is a time period from the generation of the error to the execution of automatic error skipping. This value may be a fixed value or a variable value which can be set.

Then, in step (10), respective item values of the job-information area (JI) 303e and the error-information area (EI) 303f are notified to the computer 100, serving as the source of the data transmission. Then, in step (11), it is determined if the set value for the use of automatic error skipping within the environment-information area 303d is "ON". If the result of the determination in step (11) is negative, the process returns to step (3). If the result of the determination in step (11) is affirmative, the process proceeds to step (12).

In step (12), the processing described in the "action contents" item of the error detail table (EDTBL) making the error code determined in step (5) a key is executed. Then, in step (13), the respective item values of the job-information area 303e and the error-information area (EI) 303f are output from the printing unit 307 as a sample image as shown in FIG. 6, in order to notify the user of job-cancel information.

Upon completion of such job cancel steps, the same processing starting from step (3) shown in FIG. 7 is repeated.

Next, the input processing will be described with reference to the flowchart shown in FIG. 9.

Figure 9:
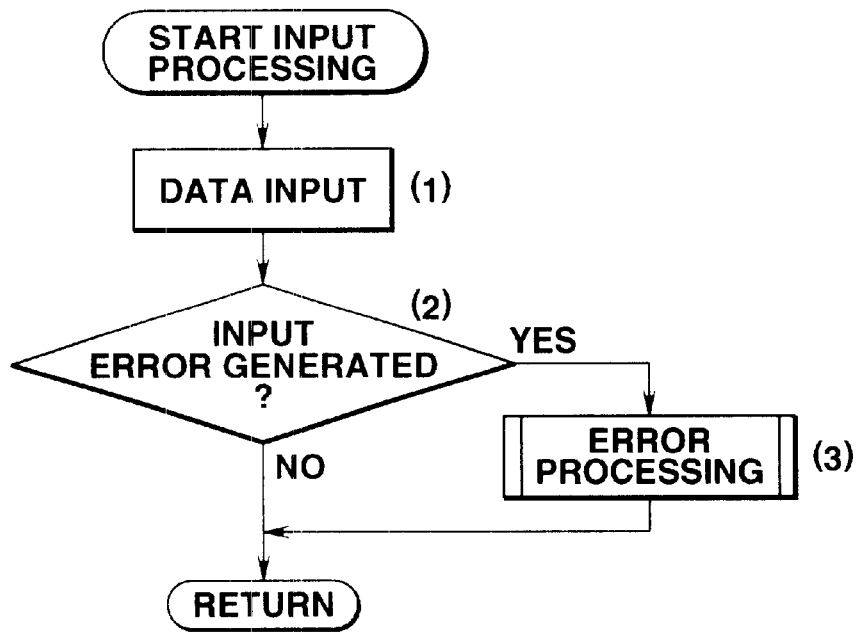
FIG. 9 is a flowchart illustrating a third data processing procedure in the printing control apparatus shown in FIG. 2.

FIG. 9 is a flowchart illustrating a third data processing procedure in the printing control apparatus of the invention. This flowchart corresponds to the detailed procedure of the input processing shown in FIG. 7. Numerals (1)–(3) represent respective steps.

First, in step (1), printing data input from the computer 100 via the interface 200 and the input/output unit 305 is stored in the input buffer storage 303a. Then, in step (2), it is determined if an input error has been generated during the data input processing of step (1). If the result of the determination in step (2) is affirmative, the process jumps to error processing of step (3). If the result of the determination in step (2) is negative, the input processing is terminated.

Next, the development processing will be described with reference to the flowchart shown in FIG. 10.

Figure 10:
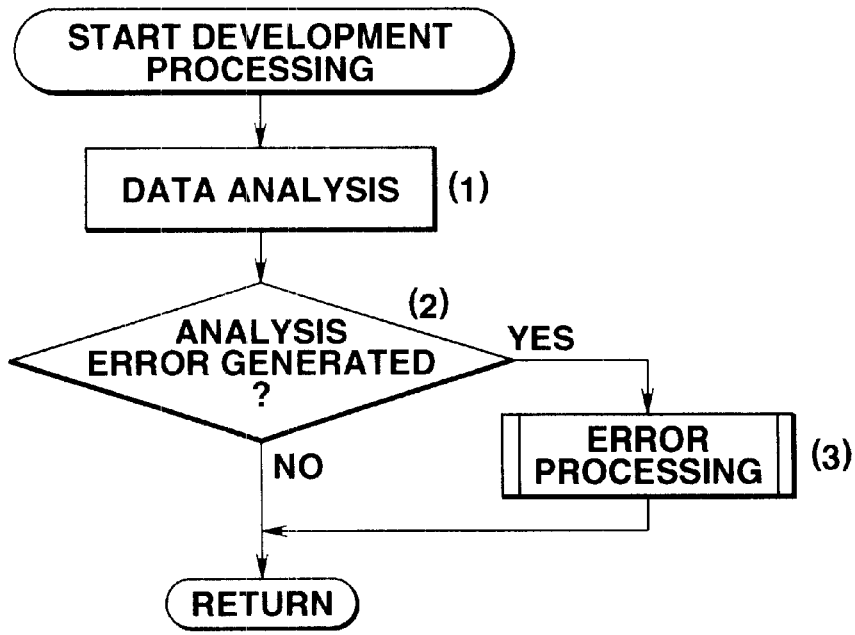
FIG. 10 is a flowchart illustrating a fourth data processing procedure in the printing control apparatus shown in FIG. 2.

FIG. 10 is a flowchart illustrating a fourth data processing procedure in the printing control apparatus of the invention. This flowchart corresponds to the detailed procedure of the development processing shown in FIG. 7. Numerals (1)–(3) represent respective steps.

First, in step (1), printing data stored in the input buffer storage 303a is analyzed according to a predetermined command format, and develops the data in the form of a bit map in the page buffer storage 303b. Then, in step (2), it is determined if an analysis error has been generated during the data analysis processing in step (1). If the result of the determination in step (2) is affirmative, the process jumps to error processing of step (3). If the result of the determination in step (2) is negative, the development processing is terminated.

Next, the output processing will be described with reference to the flowchart shown in FIG. 11.

Figure 11:
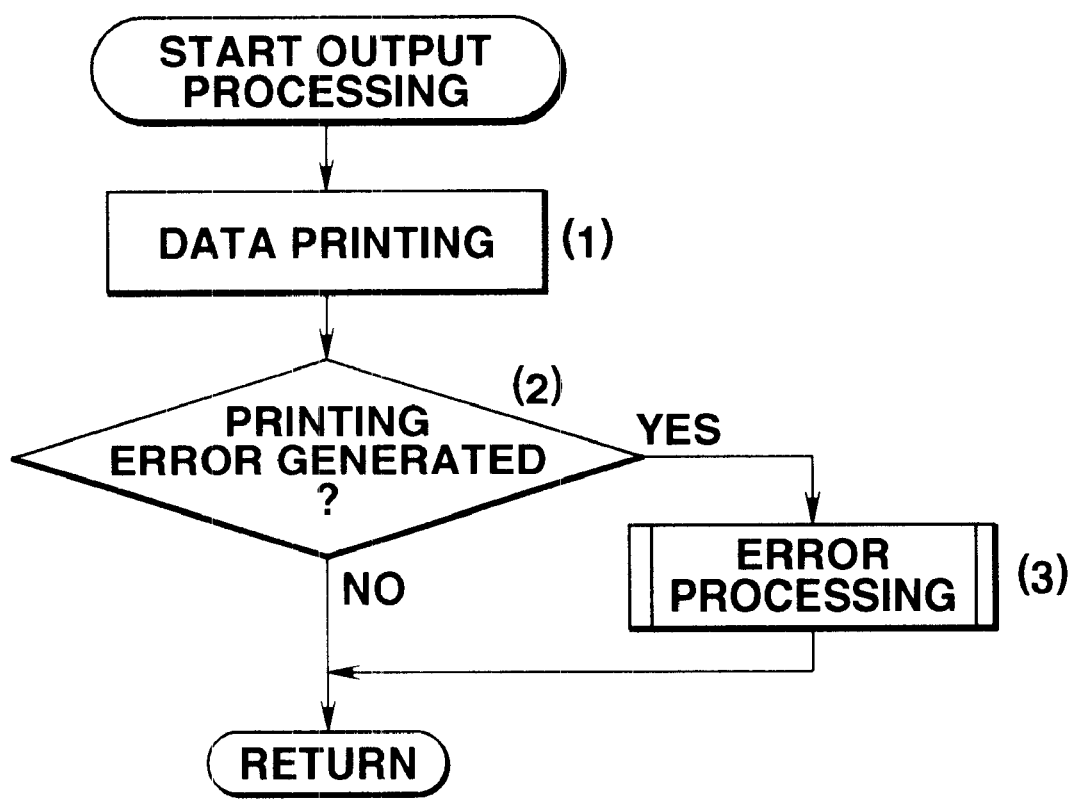
FIG. 11 is a flowchart illustrating a fifth data processing procedure in the printing control apparatus shown in FIG. 2.

FIG. 11 is a flowchart illustrating a fifth data processing procedure in the printing control apparatus of the invention. This flowchart corresponds to the detailed procedure of the output processing shown in FIG. 7. Numerals (1)–(3) represent respective steps.

First, in step (1), bit-map data stored in the page buffer storage 303b is transmitted to the printing unit 307 via the printing-unit I/F 306, and a bit-map image is printed on an actual sheet. Then, in step (2), it is determined if a printing error has been generated during the data printing processing of step (1). If the result of the determination in step (2) is affirmative, the process jumps to error processing of step (3). If the result of the determination in step (2) is negative, the output processing is terminated.

Second Embodiment

Although in the first embodiment, a description has been provided assuming an environment in which the computer 100 and the printing apparatus 300 are directly connected to each other, the computer 100 and the printing apparatus 300 may be connected via a network. In such a case, it is possible to notify only a specific user of error information or job-cancel information. Such an approach according to a second embodiment of the present invention will now be described.

In the first embodiment, in step (10) shown in FIG. 8, the respective item values of the job-information area (JI) 303e and the error-information area (EI) 303f are notified to the computer 100, serving as the source of the data transmission. However, when the computer 100 and the printing apparatus 300 are connected to each other via a network as in the second embodiment, the respective item values are notified to network users stored in the "person to be notified" item of the error detail table (EDTBL) making the error code determined in step (5) shown in FIG. 8 a key.

The values in the "person to be notified" item can be changed if necessary through the operation panel 309 or setting utility operating in the computer 100.

In the first embodiment, in step (13) shown in FIG. 8, the job-cancel information is transmitted to the user by printing the information in the printing apparatus 300. In the second embodiment, however, the job-cancel information is transmitted to computers 100 connected to the network and stored in the "job transmission PC" item of the job-information (JI) area 303e.

Thus, an error generated in the printing apparatus 300 is instantaneously notified to the concerned user, and it is possible to shorten the down time of the printing apparatus 300 by the user's release of the error.

Even if the user has overlooked this error information and job cancelling has been automatically executed, the job-cancel information is displayed on the user's computer. Hence, if the user sees that information and prints a job where an error is not generated, loss due to the time to go to the printing appartus can be prevented.

Third Embodiment

In the above-described second embodiment, when the computer 100 and the printing apparatus 300 are connected to each other via a network, error information and job-cancel information of the printing apparatus 300 are transmitted to the computer of the concerned user. In a third embodiment of the present invention, however, the telephone number of a portable terminal of each user is set in the user's value in the "person to be notified" item of the error detail table (EDTBL), and error-information and job-cancel information having the telephone number is transmitted to a modem server on the network.

In the modem server, a program for notifying information operates. The information notifying program in the modem server which has received data transmits the error information and the job-cancel information to the portable terminal indicated by the telephone number in the data. It is thereby possible to assuredly notify the concerned user of a problem generated in the printing apparatus.

Fourth Embodiment

In the above-described second embodiment, when the computer 100 and the printing apparatus 300 are connected to each other via a network, error information and job-cancel information of the printing apparatus 300 are transmitted to the computer of the concerned user. In a fourth embodiment of the present invention, however, the mail address of each user is set in the user's value in the "person to be notified" item of the error detail table (EDTBL).

When an error has been generated in the printing apparatus, that information may be notified to the concerned user by forming error information and job-cancel information in which the mail address of the concerned user is used for the person to be notified and transmitting the formed information to a mail server on the network.

The characteristic configuration of the fourth embodiment will now be described with reference to FIG. 7 and others.

A printing controlling apparatus which controls processing of printing printing information received by communicating with a data processing apparatus (computer 100) via a predetermined communication medium (interface) and which is configured in the above-described manner includes a detection unit for detecting an error for a printing job based on printing information received from the data processing apparatus, a determination unit for determining a type of the error detected by the detection unit, a releasing unit for executing error releasing processing based on the type of the error determined by the determination unit, a first notification unit for notifying a source of transfer of the printing information of the type of the error determined by the determination unit, a cancelling unit for cancelling the printing job after the error releasing processing by the releasing unit, and a second notification unit for notifying the source of transfer of the printing information of information relating to the cancel by the cancelling unit. Hence, even if an error of each type is generated during processing of printing information received from the data processing apparatus, it is possible to execute error releasing processing corresponding to the type of the error, and to provide a state in which printing information can be received.

A printing controlling apparatus which controls processing of printing printing information received by communicating with a plurality of data processing apparatuses (a plurality of computers (not shown) including the computer 100) via a predetermined communication medium (interface) includes a detection unit for detecting an error for a printing job based on printing information received from the data processing apparatus, a determination unit for determining a type of the error detected by the detection unit, a releasing unit for executing error releasing processing based on the type of the error determined by the determination unit, a first notification unit for notifying a source of transfer of the printing information of the type of the error determined by the determination unit, a cancelling unit for cancelling the printing job after the error releasing processing by the releasing unit, and a second notification unit for notifying one of the data processing apparatuses of information relating to the cancel by the cancelling unit. Hence, even if printing information is received from one of the data processing apparatuses and an error of each type generated during processing of the received printing information, it is possible to execute error releasing processing corresponding to the type of the error, to provide a state in which respective printing information from another data processing apparatus can be received, to shorten the time until each data processing apparatus can perform printing, and to reduce burden in error releasing processing.

The configuration of a data processing program capable of being read in a printing system to which the printing control apparatus of the invention can be applied will now be described with reference to the memory map shown in FIG. 12.

FIG. 12 is a diagram illustrating a memory map of a storage medium storing various kinds of data processing programs capable of being read in a printing system to which the present invention can be applied.

Although not particularly illustrated, information for controlling a group of programs stored in the storage medium, such as version information, the author and the. like, is stored, and information depending on an OS (operating system) or the like at the program reading side, such as an icon for identifying and displaying the program, or the like, is, in some cases, stored.

Data belonging to each program is also controlled in the directory. Furthermore, programs for installing various programs in the computer, and programs for defrosting compressed programs to be installed, and the like are, in some cases, stored.

The functions shown in FIGS. 7–11 in the foregoing embodiments may be executed by a host computer according to a program installed from the outside. In this case, the present invention can also be applied to a case in which an information group including the program is supplied to an output device from a storage device, such as a CD(compact disc)-ROM, a flash memory, a FD or the like, or from an external storage medium via a network.

The objects of the present invention may, of course, also be achieved by supplying a system or an apparatus with a storage medium storing program codes of software for realizing the functions of the above-described embodiments, and reading and executing the program codes stored in the storage medium by means of a computer (or a CPU or an MPU (microprocessor unit)) of the system or the apparatus.

In such a case, the program codes themselves read from the storage medium realize the functions of the above-described embodiments, so that the the storage medium storing the program codes constitutes the present invention.

For example, a floppy disk, a hard disk, an optical disk, a magnetooptical disk, a CD-ROM, a CD-R (recordable), a magnetic tape, a nonvolatile memory card, a ROM, an EEPROM (electrically erasable and programmable read-only memory) or the like may be used as the storage medium for supplying the program codes.

The present invention may, of course, be applied not only to a case in which the functions of the above-described embodiments are realized by executing program codes read by a computer, but also to a case in which an OS or the like operating in a computer executes a part or the entirety of actual processing, and the functions of the above-described embodiments are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

According to the above-described embodiments, in an apparatus which receives data from an external apparatus, such as a host computer or the like, and which performs printing by developing the received data into bit-map data or the like, even if an error is generated during processing, it is possible to automatically return to a data receivable state after the lapse of a preassigned time.

Fifth Embodiment

Figure 13:
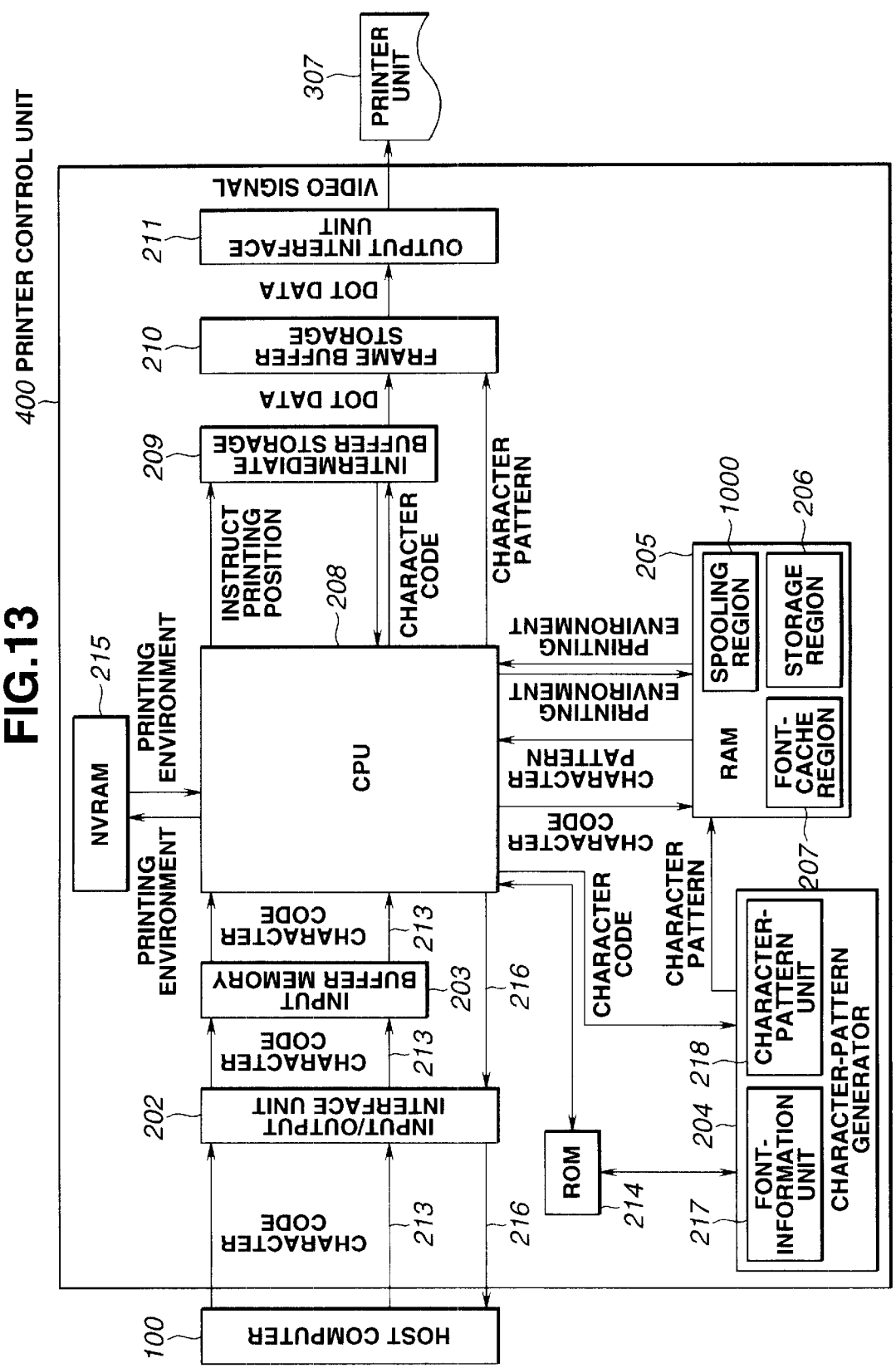
FIG. 13 is a schematic block diagram illustrating the configuration of a printer controller of the LBP shown in FIG. 1 according to a fifth embodiment of the present invention.

FIG. 13 is a block diagram illustrating the configuration of a printing control apparatus according to a fifth embodiment of the present invention. This configuration corresponds to the schematic configuration of the printer controller 400 of the LBP shown in FIG. 1. In FIG. 13, a printer controller 400 of an LBP main body 300 receives data 213, comprising character codes transmitted from a host computer 100, serving as a source generating printing information, external fonts, form information, macro-registration information and the like, and prints document information and the like in units of a page.

In FIG. 13, an input/output interface unit 202 exchanges all kinds of information with the host computer 100. An input buffer memory (input buffer) 203 temporarily stores all kinds of information input via the input/output interface unit 202.

A character-pattern generator 204 includes a font-information unit 217 where the attributes, such as the width, the height and the like, of each character, and the address of each actual character pattern are stored, a character-pattern unit 218 where character patterns themselves are stored, and a reading control program for these units.

The reading control program is stored in an ROM 214, and also has a code conversion function of calculating the address of the character pattern corresponding to an input character code.

A RAM 205 includes a spooling region 1000 for temporarily storing printing data of a printing job, a font-cache region 207 for storing a character pattern output from the character-pattern generator 204, and a storage region 206 for storing an external font and form information transmitted from the host computer 100, current printing environment and the like. The spooling region 1000 may be provided in a hard disk detachably mountable in a device other than the RAM 205, or a hard disk within the apparatus.

By thus storing pattern information relating to a developed character pattern in the font-cache region 207 as a font cache, it is unnecessary to perform pattern development by again decoding the same character when printing the same character. Hence, development into a character pattern is accelerated.

A CPU 208 operates the entire control system of the printer so as to control the entire apparatus according to a control program for the CPU 208 stored in the ROM 214. An intermediate buffer storage 209 stores an internal data group generated based on the input data 213. Upon reception of data for one page, the received data is converted into simpler internal data and is stored in the intermediate buffer storage 209. The data is then stored in a frame buffer storage 210 in the form of a printing image. The frame buffer storage 210 can store at least data for one page in the case of full painting, and printing image for two bands in the case of partial painting.

An input/output interface unit 211 generates a video signal corresponding to patttern information from the frame buffer storage 210, and controls interface with a page-printer printing unit 307. The page-printer printing unit (printer unit) 307 is a printing mechanism portion of a page printer, which receives the video signal from the output interface unit 211 and prints image information based on the video signal.

A nonvolatile memory (hereinafter termed a "NVRAM") 215 comprises an ordinary EEPROM or the like, and stores a panel set value assigned through an operation panel 309. Data 216 is transmitted to the host computer 100 from the LBP main body 300.

A program for analyzing data input from the host computer 100 is stored in the ROM 214. This program is generally called a translator.

The characteristic configuration of the fifth embodiment will now be described with reference to FIG. 13 and others.

The printing control apparatus which can perform printing processing by sequentially spooling printing data received from the data processing apparatus (host computer 100) via a predetermined communication medium (including an interface and a network) and analyzing the spooled printing data in units of a job, and which is configured in the above-described manner includes a control unit for changing, when interrupting printing processing during processing of printing spooled printing data, an execution schedule for each spooled job, for example, so as to preferentially execute a job of printing data being spooled in the RAM 205 and capable of being printed, by analyzing an error causing the interruption (the CPU 208 performs control by executing a control program stored in the ROM 214 or other memory resources). Hence, when a plurality of jobs can be spooled, the error of the preceding job is analyzed, and when a job which does not influence succeeding jobs is spooled, succeeding jobs are sequentially processed. As a result, the efficiency in processing of each job is greatly improved.

The printing control apparatus, which can perform printing processing by sequentially spooling printing data received from the data processing apparatus (host computer 100) via a predetermined communication medium (including an interface and a network), for example, in the RAM 205 and analyzing the spooled printing data in units of a job, includes an assigning unit for assigning a time-out time from the generation of an error in a job being subjected to printing processing until start of processing of printing the succeeding job (for example, one of "no time-out time", "10 seconds", "1 minute" and "5 minutes" is assigned by a key operation of the operation panel 309, or a command is assigned according to utility in the host computer 100), a time counting unit for counting the time-out time assigned by the assigning unit from the generation of the error of the job being subjected to printing processing (by an internal timer of the CPU 208), and a job control unit for causing preferential sequential processing of succeeding spooled jobs (the CPU 208 performs control processing by executing a control program stored in the ROM 214 or other memory resources). Hence, when a plurality of jobs can be spooled, succeeding spooled jobs can be sequentially processed at the timing after the lapse of the assigned time-out time from the generation of an error in the preceding job. As a result, the efficiency in processing of each spooled job can be greatly improved.

The printing control apparatus further includes a determination unit for determining if the type of the generated error in the job being subjected to printing processing is a cause peculiar to the job (for example, consumption of sheets of an assigned size, insufficient memory capacity, unloading of an assigned font, or the like) (the CPU 208 performs determination by executing a control program stored in the ROM 214 or other memory resources). When it has been determined that the type of the error in the job being subjected to printing processing is a cause peculiar to the job, and the counting of the assigned time-out time has been completed, the CPU 208 causes sequential processing of succeeding spooled jobs. Hence, when a plurality of jobs can be spooled, succeeding spooled jobs can be sequentially processed at the timing of the lapse of the assigned time-out time if the error in the preceding job is a cause peculiar to the interrupted job. As a result, the efficiency in processing of each spooled job can be greatly improved.

The cause peculiar to the job originates from a state of insufficiency of printing resources (such as consumption of sheets, insufficient memory capacity, unloading of an assigned font, or the like). Hence, if the succeeding job can continue printing processing using remaining printing resources, printing environment in which printing processing need not be interrupted can be provided.

The printing resources also include font resources (in the fifth embodiment, the font resources can be downloaded from a font card or the host computer), recording-medium resources (in the fifth embodiment, the sheet size can be changed using a sheet cassette), and memory resources (in the fifth embodiment, the memory capacity can be expanded by an optional RAM), and the printing command which cannot be processed includes a printing command for image data (for example, when image data in an unsupported format (supported values for resolution, compression format, and the like may differ depending on the apparatus, so that an unsupported value results in an error) is transmitted). Hence, if the succeeding job can be subjected to printing processing using one of remaining font resources, recording-medium resources and memory resources, a printing environment in which printing processing need not be interrupted can be provided.

The printing control apparatus further includes a page determination unit for determining if the page where an error is generated in the job being subjected to printing processing is the leading page in the printing data (the CPU 208 performs determination processing by executing a control program stored in the ROM 214 or other memory resources). When it is determined that the page where the error is generated in the job being subjected to printing processing is the leading page in the printing data, the CPU 208 starts counting of the time-out time. If an error is generated in a page other than the leading page, job processing becomes rather troublesome. Hence, it is possible to prevent in advance exchange of the job order in such a case.

The printing control apparatus further includes a spool determination unit for determining if the succeeding job is spooled when an error is generated in a job being subjected to printing processing (the CPU 208 performs determination processing by executing a control program stored in the ROM 214 or other memory resources). When it is determined that the succeeding job is spooled, the CPU 208 starts counting of the time-out time. Hence, it is possible to provide an environment in which the processing of the succeeding job can be promptly started by avoiding execution of useless data processing.

The CPU 208 causes sequential processing by replacing the interrupted job by the succeeding spooled job. Hence, it is possible to process the preceding job by promptly dealing with a state of release of the error after the job order has been changed.

The CPU 208 causes sequential processing by rearranging succeeding spooled jobs so that the interrupted job becomes the last job in the succeeding jobs. Hence, even if the error is not released after the job order has been changed, it is possible to reduce processing of rearranging the output order of the interrupted job and the succeeding jobs.

The priting control appartus further includes a spool determination unit for determining if the succeeding job is spooled when an error is generated in the job being subjected to printing processing (the CPU 208 performs determination processing by executing a control program stored in the ROM 214 or other memory resources). When it is determined that the succeeding job is not spooled, the CPU 208 causes processing of the interrupted job. Hence, even if the error is not released after the job order has been changed, it is possible to reduce processing of rearranging the output order of the interrupted job and the succeeding jobs, and to efficiently process the entirety of a plurality of spooled jobs.

The printing control apparatus further includes a memory for storing an error in a job generated during the printing processing, and a release determination unit for determining if the error stored in the memory is released at every processing of the succeeding job (the CPU 208 performs determination processing by executing a control program stored in the ROM 214 or other memory resources). When it is determined that the error stored in the RAM 205 is released, the CPU 208 causes processing of the interrupted job. Hence, when the interrupted error is released, it is possible to promptly process even a preceding job whose output order is made to be inferior, and to flexibly process the preceding job for the released state of the error.

Next, a control procedure for determining whether or not job exchange, which is a feature of the present invention, is to be performed when some error has been generated will be described with reference to the flowchart shown in FIG. 14.

Figure 14:
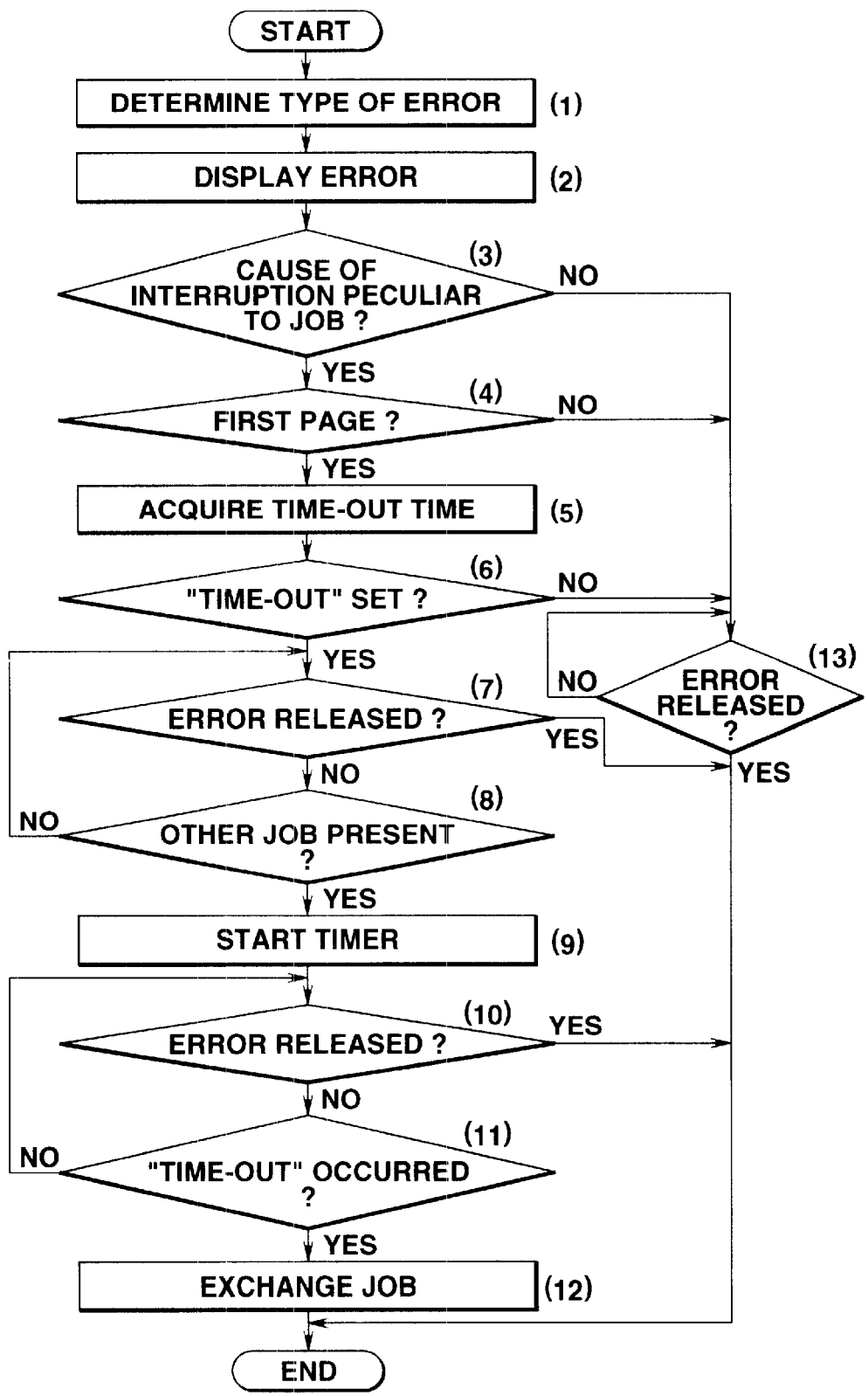
FIG. 14 is a flowchart illustrating a first data processing procedure in a printing control apparatus to which the present invention is applied.

FIG. 14 is a flowchart illustrating a first data processing procedure in the printing control apparatus of the invention. Numerals (1)–(13) represent respective steps.

First, in step (1), the type of the error is determined. In step (2), an error message corresponding to the determined type of the error is displayed on an LCD on the operation panel 309.

In the LBP main body 300 of the fifth embodiment, displays of typical errors from among errors which can be generated are shown in FIG. 15. A description will now be provided of the contents of each display.

FIG. 15 is a diagram illustrating examples of error messages displayed on the LCD of the operation panel 309 shown in FIG. 1.

In FIG. 15, an error message E1 notifies the operator that sheet jam has occurred within the sheet feeding mechanism of the LBP. The error is released when the operator removes the jammed sheet.

An error message E2 notifies the operator that sheets necessary for printing are not set. The type of necessary sheets is displayed at a portion ##. The error is released when the operator sets the necessary sheets.

An error message E3 notifies the operator that printing data is too complicated to be processed with the capacity of the mounted memory and therefore a satisfactory result of printing cannot be guaranteed. The error is released when the operator instructs "continuation" by a key operation of the operation panel 307. However, a satisfactory result of printing is not guaranteed.

An error message E4 notifies the operator that the font assigned in printing data is not mounted in the LBP and therefore a satisfactory result of printing is not guaranteed. The error is released when the operator instructs "continuation" by a key operation of the operation panel 309. However, a satisfactory result of printing is not guaranteed.

Then, in step (3), it is determined whether the generated error is peculiar to the job and printing data for another job can be output, or the generated error is not peculiar to the job and printing data of any other job cannot be output.

For example, in the case of the error message E1 shown in FIG. 15, it is determined that the error is due to a physical trouble in the printing mechanism and therefore is not peculiar to the job, so that printing data of any other job cannot be output. In the case of the error message E2, if sheets of any other type are set although sheets of the requested type are not set, it is determined that the error is peculiar to the job, so that printing data of another job may be output. On the other hand, if no sheets are mounted, it is determined that the error is not peculiar to the job, and therefore printing data of any other job cannot be output.

In the case of the error messages E3 and E4, it is detemined that the error is peculiar to the job, and printing data of any other job may be output.

When it has been determined in step (3) that the error is not peculiar to the job (for example, the error message E1), the process proceeds to step (13), where the processing is stopped until the error is released. When the error has been released, the data processing of the job where the error is generated is resumed without exchanging jobs.

When it has been determined in step (3) that the error is peculiar to the job (for example, the error message E3), the process proceeds to step (4), where it is determined if the page being processed is the first page. If the result of the determination in step (4) is negative, the process proceeds to step (13), and jobs are not exchanged.

On the other hand, if the result of the determination in step (4) is affirmative, the process proceeds to step (5), where the set time-out time is acquired.

The time-out time has been set in advance by a key operation of the operation panel 309, and is stored in the NVRAM 215. The time-out time is set to one of "no time-out time", "10 seconds", "1 minute" and "5 minutes".

Then, in step (6), it is determined if the time-out time is set. If the result of the determination in step (6) is negative, i.e., if the time-out time is set to "no time-out time", the process proceeds to step (13), and jobs are not exchanged.

If the result of the determination in step (6) is affirmative, i.e., if it has been determined that an effective time-out time is set, the process proceeds to step (7), where the processing is stopped for that time period, and it is determined if the error is released by the operator. If the result of the determination in step (7) is affirmative, the processing is terminated without performing job exchanging processing, in order to resume the data processing of the job where the error has been generated.

On the other hand, if the result of the determination in step (7) is negative, the process proceeds to step (8), where it is determined if any other job is present. If the result of the determination in step (8) is negative, the process returns to step (7), where it is again determined if the error is released.

If the result of the determination in step (8) is affirmative, the process proceeds to step (9), where a timer (not shown) is started. Then, in step (10), it is determined if the error is released. If the result of the determination in step (10) is affirmative, the data processing of the job where the error has been generated is resumed without performing processing of exchanging jobs.

If the result of the determination in step (10) is negative, the process proceeds to step (11), where it is determined if time-out has occurred. This corresponds to determination if the time period from step (9) reaches the time acquired in step (5).

If the result of the determination in step (11) is negative, the process returns to step (10), where it is again determined if the error is released.

If the result of the determination in step (11) is affirmative, the process proceeds to step (12), where job rearrangement which is a feature of the fifth embodiment is performed, and succeeding jobs are preferentially processed.

The rearrangement of jobs in the fifth embodiment is performed only when any other spooled job is present, and the job whose processing is postponed due to the generation of the error is placed at the last position of jobs spooled at that time.

Spooling of a job is realized by holding data of the job in the RAM 205 as a file. The internal structure of the filing system in the RAM 205 is the same as that used in an operating system (OS) of an ordinary computer, or the like. Hence, further description thereof will be omitted.

In the fifth embodiment, after turning on the power supply, the file title for spooling the first job is "spool.0". Thereafter, file titles are sequentially determined and spooled as "spool.1", "spool.2", "spool.3", . . .

Since data processing is sequentially performed from "spool.0", the spooled jobs are sequentially processed in the order of spooling unless the jobs are not rearranged. The processing procedure for the spooled jobs will now be described with reference to FIG. 16.

Figure 16:
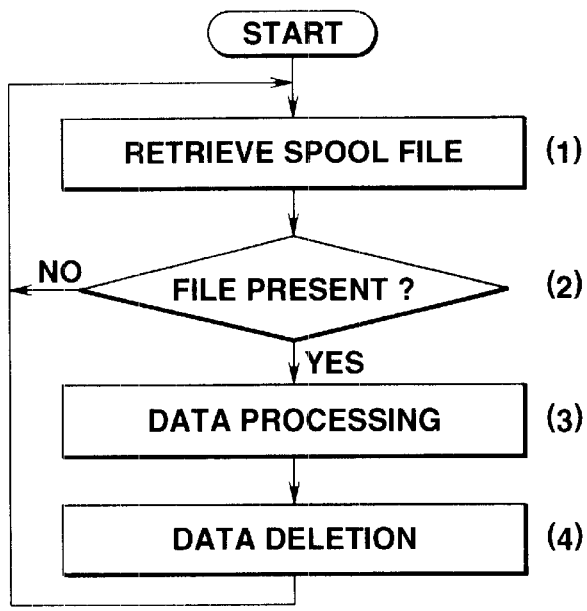
FIG. 16 is a flowchart illustrating a second data processing procedure in the printing control apparatus of the invention.

FIG. 16 is a flowchart illustrating a second data processing procedure in the printing control apparatus of the invention. Job rearranging processing is realized by utilizing the flochart shown in FIG. 17. In FIG. 16, numerals (1)–(4) represent respective steps.

First, in step (1), retrieval of spool files is performed. In this processing, the job having the smallest number is searched from the spool file group in the filing system.

Then, in step (2), it is determined if a spool file is present. If the result of the determination in step (2) is negative, the process returns to step (1), where retrieval of spool files is again performed. That is, the process does not proceeds until a job is spooled.

If the result of the determination in step (2) is affirmative, the process proceeds to step (3), where printing data stored in the retrieved file is processed. Upon completion of the processing, the process proceeds to step (4), where the file is deleted. The process then returns to step (1), where a file to be subsequently processed is retrieved.

In the fifth embodiment, a region where a number for generating the title of the spool file is provided in the RAM 205. This number (hereinafter termed a "file-title generation number") is initialized to a number "0" when turning on the power supply, and is thereafter incremented every time a new spool file is generated.

That is, the title of a new spool file is determined based on this number. For example, when generating a new spool file in a state in which this number is 70, the file title becomes "spool.70", and the number is updated to "71" after generating the file.

In step (9) shown in FIG. 14, the processing of rearranging jobs is realized by utilizing this approach. The control procedure for this processing will now be described with reference to the flowchart shown in FIG. 17.

Figure 17:
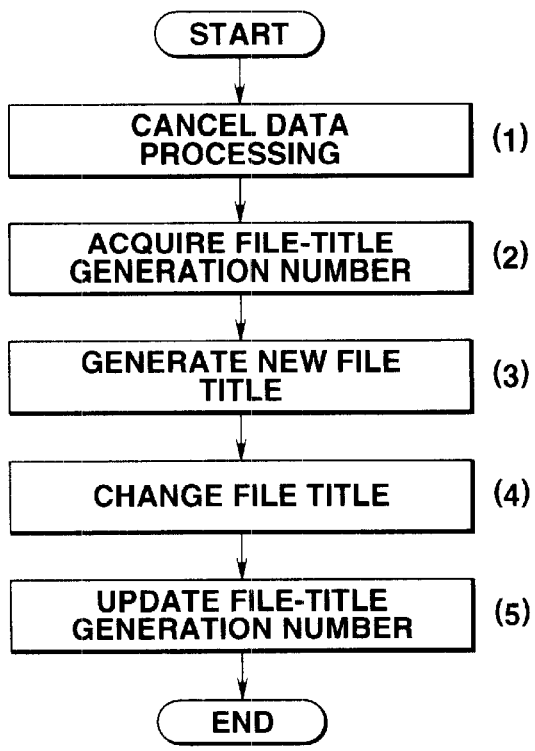
FIG. 17 is a flowchart illustrating a third data processing procedure in the printing control apparatus of the invention.

FIG. 17 is a flowchart illustrating a third data processing procedure in the printing control apparatus of the invention. This flowchart corresponds to the detailed procedure of job updating in the job rearranging processing shown in FIG. 14. Numerals (1)–(5) represent respective steps.

First, in step (1), the data processing of the job being processed, i.e., the job where the error is generated, is cancelled.

Then, in step (2), the number for generating the title of the current file is acquired. In step (3), the title of the spool file is newly generated based on this number.

The process then proceeds to step (4), where the title of the spool file of the job subjected to time-out counting due to the error is changed to the file title generated in step (3). In step (5), the file-title generation number is incremented by one, and the job rearranging processing is terminated.

According to this arranging processing, it becomes possible to referentially process a job capable of being processed by retarding the processing for the job for which processing cannot be continued due to the error. This approach is particularly effective in an environment in which the printing control apparatus is connected to a network in order to be used by a plurality of users.

Sixth Embodiment

In the fifth embodiment, a case in which a job subjected to time-out counting due to an error is moved to the last position of jobs spooled at that time has been described. However, it is also possible to perform control so that the job whose processing is retarded is not processed until all of the spooled jobs are processed and the LBP main body 300 assumes a waiting state. Such an approach according to a sixth embodiment of the present invention will now be described. In the sixth embodiment, the present invention is applied to an LBP and a description will be provided with reference to the drawings. Since the configuration of the sixth embodiment is the same as that of the fifth embodiment described with reference to FIGS. 1 and 13, further description thereof will be omitted.

A control procedure for determining if it is necessary to rearrange jobs, and the types of generated errors are the same as those in the first embodiment described with reference to FIGS. 14 and 15. Hence, further description thereof will be omitted.

In the sixth embodiment, there are spools in which file titles are provided in the format of "spool.0", "spool.1", "spool.2", . . . as described in the fifth embodiment, and spools in which file titles are provided in the format of "spoolD.0", "spoolD.1", "spoolD.2", . . . The latter spools are termed delay spools, and each file thereof is termed a delay-spool file.

In the RAM 205, a region where a number for generating the title of the delay-spool file is stored is provided. This number (hereinafter termed a "delay-file-title generation number") is initialized to a number "0" when turning on the power supply, and is thereafter incremented every time a new delay-spool file is generated.

That is, the title of a new delay-spool file is determined based on this number.

Data processing is sequentially performed from "spool.0" as in the fifth embodiment. When there is no spool file, data processing of a delay-spool file is performed.

The control procedure for this data processing will now be described with reference to the flowchart shown in FIG. 18.

Figure 18:
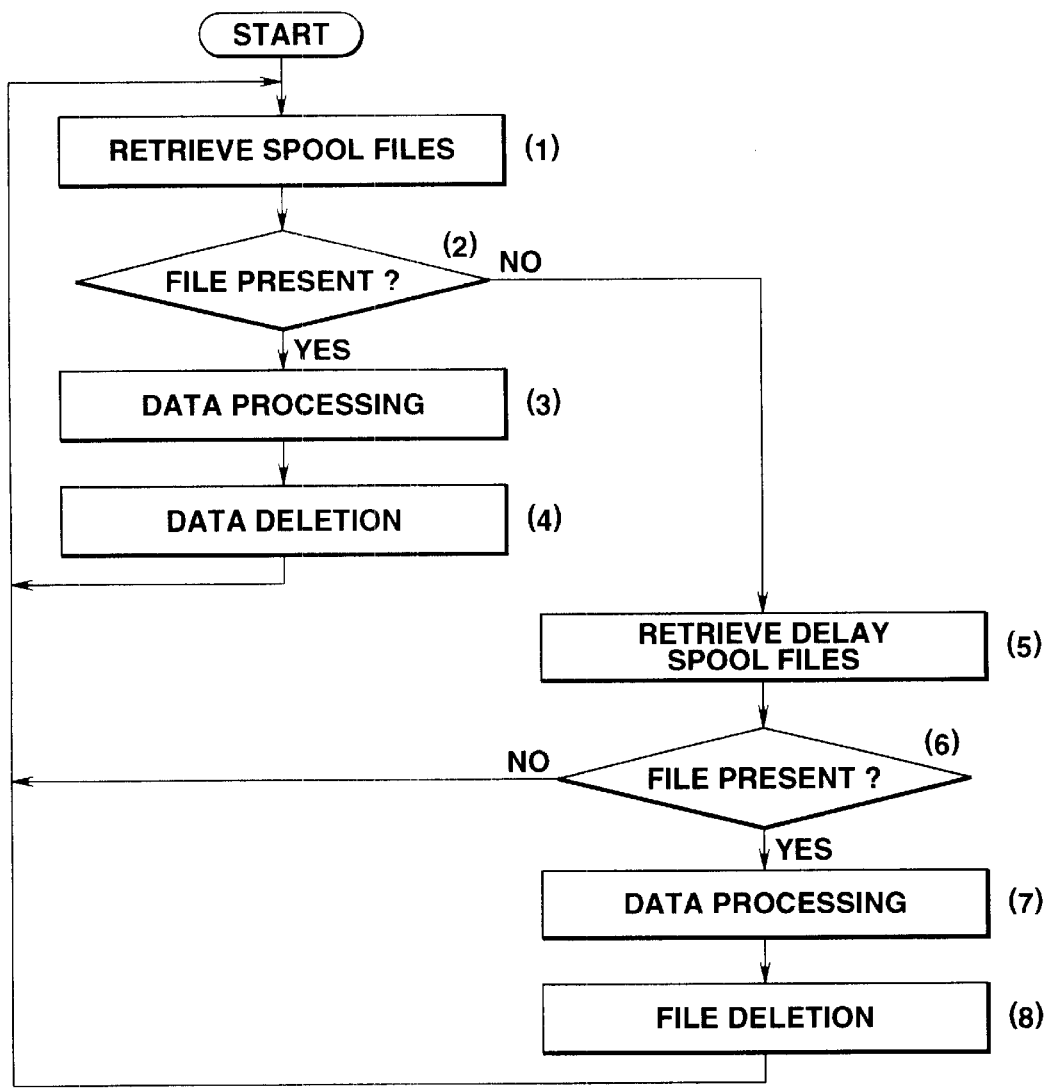
FIG. 18 is a flowchart illustrating a fourth data processing procedure in the printing control apparatus of the invention.

FIG. 18 is a flowchart illustrating a fourth data processing procedure in the printing control apparatus of the invention. Numerals (1)–(8) represent respective steps.

First, in step (1), retrieval of spool files is performed. In this processing, the job having the smallest number is searched from the spool file group in the filing system.

Then, in step (2), it is determined if a spool file is present. If the result of the determination in step (2) is negative, the process proceeds to step (5), where processing of a delay spool is performed.

If the result of the determination in step (2) is affirmative, the process proceeds to step (3), where printing data stored in the retrieved file is processed. Upon completion of the processing, the process proceeds to step (4), where the file is deleted. The process then returns to step (1), where a file to be subsequently processed is retrieved.

If the result of the determination in step (2) is negative, the process proceeds to step (5), where delay-spool files are retrieved. In this processing, the job having the smallest number is searched from the delay-spool file group in the file system.

Then, in step (6), it is determined if a spool file is present. If the result of the determination in step (6) is negative, the process returns to step (1), where spool files are again retrieved.

If the result of the determination in step (6) is affirmative, the process proceeds to step (7), where printing data stored in the retrieved spool file is processed. Upon completion of the processing, the process proceeds to step (8), where the spool file is deleted. The process then returns to step (1), where a spool file to be subsequently processed is retrieved.

Figure 19:
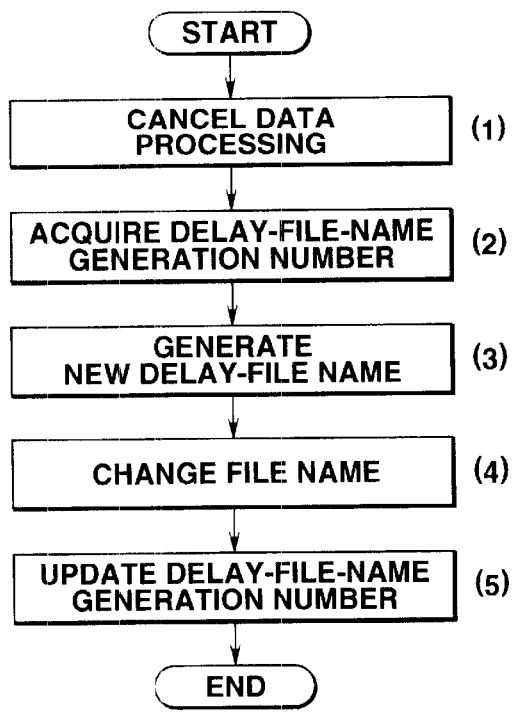
FIG. 19 is a flowchart illustrating a fifth data processing procedure in the printing control apparatus of the invention.

Job rearranging processing is realized by utilizing the flowchart shown in FIG. 19.

FIG. 19 is a flowchart illustrating a fifth data processing procedure in the printing control apparatus of the invention. Numerals (1)–(5) represent respective steps.

First, in step (1), the data processing of the job being processed, i.e., the job where the error is generated, is cancelled.

Then, in step (2), the number for generating the title of the current delay file is acquired. In step (3), the title of the delay spool file is newly generated based on this number.

The process then proceeds to step (4), where the title of the spool file of the job subjected to time-out counting due to the error is changed to the file title generated in step (3). In step (5), the delay-file-title generation number is incremented by one, and the job rearranging processing is terminated.

According to this arranging processing, it becomes possible to more efficiently process jobs than in the fifth embodiment.

Seventh Embodiment

In the above-described fifth and sixth embodiments, a job subjected to time-out counting due to an error cannot be reprocessed until a certain timing. Hence, when many jobs are continuoulsy transmitted, even if the error cause of the job subjected to time-out counting has been released and the job can be processed, the job is, in some cases, not reprocessed. Accordingly, control may be performed so that a job whose processing is retarded by being subjected to time-out counting is processed by causing interrupt of the job when the error cause of the job has been released. Such an approach according to a seventh embodiment of the present invention will now be described.

In the seventh embodiment, the present invention is applied to an LBP and a description will be provided with reference to the drawings. Since the configuration of the seventh embodiment is the same as that of the fifth embodiment described with reference to FIGS. 1 and 13, further description thereof will be omitted.

A control procedure for determining if it is necessary to rearrange jobs, the types of generated errors, and the file generating procedure of spools and delay spools are the same as those in the first embodiment described with reference to FIGS. 14 and 15, and in the sixth embodiment described with reference to FIG. 19. Hence, further description thereof will be omitted.

In a delay spool file in the seventh embodiment, the cause of an error subjected to time-out counting is recorded as additional information in addition to printing data transmitted from the host computer 201.

A format of a delay-spool file will now be described with reference to FIG. 20.

Figure 20:
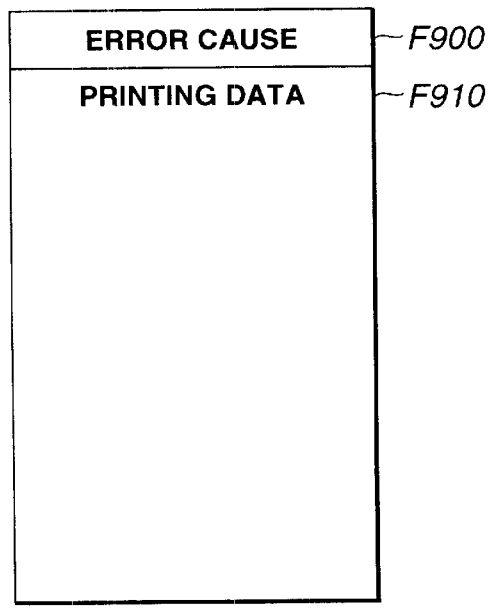
FIG. 20 is a diagram illustrating a format of a delay spool file secured in a RAM shown in FIG. 13.

FIG. 20 is a diagram illustrating a format of a delay-spool file secured in the RAM 205 shown in FIG. 13.

In FIG. 20, a field F900 is a region where the cause of an error subjected to time-out counting is stored. The error cause is held in the form of a character string. More specifically, character strings corresponding to the error messages E1, E2, E3 and E4 are "JAM", "##PAPER" (## indicates the type of the sheet), "MEMORY-FULL" and "NO-FONT", respectively. A field F910 is a region where printing data is stored.

As in the fifth embodiment, data processing is sequentially performed from "spool.0". Every time a job is processed, it is determined if the cause of an error subjected to time-out counting recorded in the delay-spool file is released at that time. If the result of the determination is affirmative, data processing of that delay-spool file is performed. From among the above-described errors, only E2 has the possibility of being released. The control procedure of this data processing will now be described with reference to the flowchart shown in FIG. 21.

Figure 21:
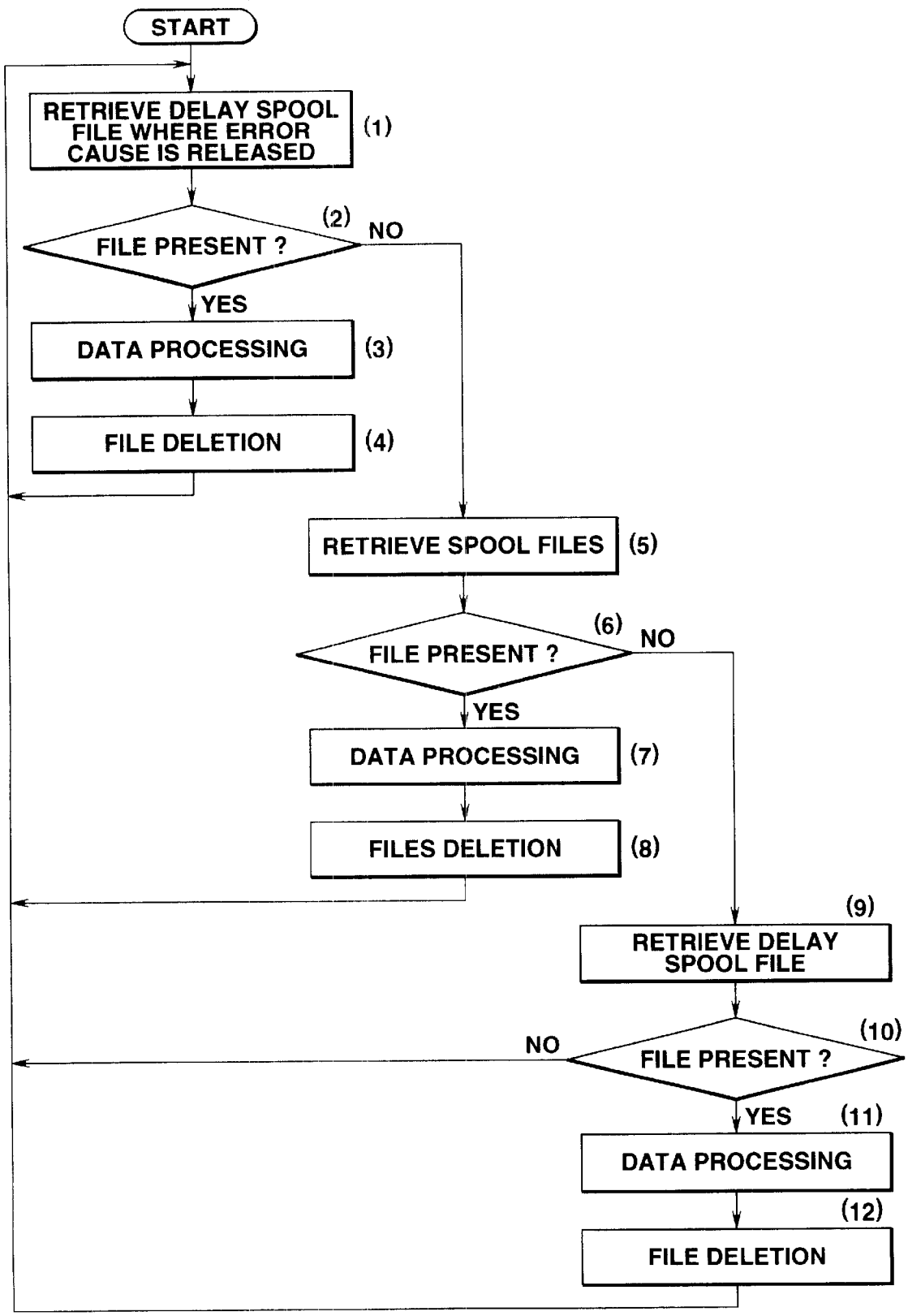
FIG. 21 is a flowchart illustrating a sixth data processing procedure in the printing control apparatus of the invention.

FIG. 21 is a flowchart illustrating a sixth data processing procedure in the printing control apparatus of the invention. Numerals (1)–(12) represents respective steps.

First, in step (1), the delay-spool file group is retrieved. In this processing, by determining if the error cause recorded in the field F900 in the file is released at this moment, a spool file where the error cause is released is searched.

Then, in step (2), it is determined if a spool file where the error cause is released is present. If the result of the determination in step (2) is negative, the process proceeds to step (5), where spool files are retrieved.

If the result of the determination in step (2) is affirmative, the process proceeds to step (3), where printing data stored in that file is processed. Upon completion of this processing, the process proceeds to step (4), where the file is deleted. The process then returns to step (1), where a file to be subsequently processed is retrieved. In step (5), spool files are retrieved. In this step, a spool file having the smallest number is searched from the spool file group in the file system.

Then, in step (6), it is determined if a spool file is present. If the result of the determination in step (6) is negative, the process proceeds to step (9), where processing of delay spools is performed. If the result of the determination in step (6) is affirmative, the process proceeds to step (7), where printing data stored in that file is processed. Upon completion of this processing, the process proceeds to step (8), where the file is deleted. The process then returns to step (1), where the next file to be processed is retrieved.

In step (9), delay-spool files are retrieved. In this processing, a file having the smallest number is searched from the delay-spool file group in the file system.

Then, in step (10), it is determined if a spool file is present. If the result of the determination in step (10) is negative, the process returns to step (1), where spool files are again retrieved. If the result of the determination in step (10) is affirmative, the process proceeds to step (11), where printing data stored in that file is processed. Upon completion of this processing, the process proceeds to step (12), where the file is deleted. The process then returns to step (1), where the next file to be processed is retrieved.

According to this processing, a job capable of being processed is promptly processed even in an environment in which many jobs are processed without intermission.

The present invention may be applied to a system comprising a plurality of apparatuses, or to an apparatus comprising a single unit.

The present invention may, of course, be applied to a case in which the objects of the invention are achieved by supplying a system or an apparatus with a program. In this case, a storage medium storing the program constitutes the present invention. By reading the program from the storage medium into the system or the apparatus, the system or the apparatus operates in a predetermined manner.

The characteristic configurations of the fifth through seventh embodiments will now be described with reference to the flowcharts shown in FIGS. 16–19, and 21.

The printing control apparatus (printer control unit 400) which can perform printing processing by sequentially spooling printing data received from the data processing apparatus (host computer 100) via a predetermined communication medium (including a network and an interface) in units of a job and analyzing the spooled printing data in units of a job, and which is configured in the above-described manner, or a storage medium storing a program capable of being read by a computer for controlling a printing apparatus which can perform printing processing by sequentially spooling printing data received from the data processing apparatus via a predetermined communication medium in units of a job and analyzing the spooled printing data in units of a job includes a time counting unit for counting the time-out time from the generation of an error in the job being subjected to printing processing until the printing processing of the succeeding job is started, and a job rearranging unit for causing preferential sequential processing of succeeding spooled jobs after the counting of the time-out time by the counting unit has been completed. Hence, when a plurality of jobs can be spooled, succeeding spooled jobs can be sequentially processed at the timing after the lapse of the assigned time-out time from the generation of an error in the preceding job. As a result, the efficiency in processing of each spooled job can be greatly improved.

The printing control apparatus further includes a page determination unit for determining if the page where an error is generated in the job being subjected to printing processing is the leading page in the printing data. When it is determined that the page where the error is generated in the job being subjected to printing processing is the leading page in the printing data, counting of the time-out time is started. If an error is generated in a page other than the leading page, job processing becomes rather troublesome. Hence, it is possible to prevent in advance exchange of the job order in such a case.

The printing control apparatus further includes a spool determination unit for determining if the succeeding job is spooled when an error is generated in a job being subjected to printing processing. When the spool determination unit has determined that the succeeding job is spooled, the time counting unit starts counting of the time-out time. Hence, it is possible to reduce processing of rearranging the output order of the interrupted job and succeeding jobs, and to efficiently process the entirety of a plurality of spooled jobs.

The job control unit causes sequential processing by replacing the interrupted job by the succeeding spooled job. Hence, it is possible to process the preceding job by promptly dealing with a state of release of the error after the job order has been changed.

The job control unit causes sequential processing by rearranging respective jobs so that the interrupted job becomes the last job in the succeeding jobs. Hence, even if the error is not released after the job order has been changed, it is possible to reduce processing of rearranging the output order of the interrupted job and the succeeding jobs.

The priting control appartus further includes a spool determination unit for determining if the succeeding job is spooled when an error is generated in the job being subjected to printing processing. When it is determined that the succeeding job is not spooled, the job control unit causes processing of the interrupted job. Hence, when the error is released, it is possible to promptly process even a preceding job whose output order is made to be inferior, and to flexibly process the preceding job for the released state of the error.

Eighth Embodiment

In the fifth embodiment, a description has been provided of a case in which spooling of a job is executed in the file system in the RAM 205. However, except for an intelligent error job as described in the sixth embodiment, control may be performed so that a server on a network exchanges the order of the interrupted job (bringing the job to the last of a queue) by spooling the job in a file system on the server, i.e., by executing spooling of the job by the host computer 100, until printing is completed. Such an approach according to an eighth embodiment of the present invention will now be described with reference to FIGS. 14 and 17, and others.

A server (for example, using the host computer 100 as the server) is provided on a network in a printing system so as to be communicatable with a plurality of printers (not shown). The processing until step (11) shown in FIG. 14 is performed in the same manner as in the first embodiment. When time-out counting is generated, the printer 100 cancels data processing instead of step (12) shown in FIG. 14, and notifies the host computer 100 of the generation of time-out counting.

In response to this notification, the file system of the host computer 100 executes the processing shown in FIG. 17.

It is thereby possible to exchange the order of the interrupted job in the server on the network, and to efficiently process succeeding jobs when an error is generated in a network printer.

The characteristic configuration of the eighth embodiment will now be described with reference to FIGS. 14 and 17, and others.

In the printing control system capable of performing printing processing and having the above-described configuration in which the server (using the host computer 100 as the server) sequentially spools printing data received from a data processing apparatus via a predetermined communication medium in a memory (including a hard disk, an expandable RAM or the like) in units of a job and transfers the spooled printing data to the printing apparatus (the printer 300), and the transferred printing data is analyzed in units of a job, when the CPU of the server detects that the printer control unit 400 has interrupted printing processing during processing of printing the printing data spooled in advance in the server, the execution schedule of each job is changed so as to preferentially execute the job of spooled printing data capable of being subjected to printing by analyzing the error. Hence, when the server can spool a plurality of jobs, and when notification of the generation of the error from the printing apparatus has been detected, if a job which does not influence the succeeding job is spooled by analyzing the error of the preceding error, succeeding jobs can be sequentially processed. As a result, efficiency in processing of each job spooled in the server can be greatly improved.

The printing control system capable of performing printing processing in which the server sequentially spools printing data received from a data processing apparatus via a predetermined communication medium (network) in units of a job and transfers the spooled printing data to the printing apparatus (the printer 300), and the transferred printing data is analyzed in units of a job, or a storage medium storing a program capable of being read by a computer for controlling a control printing system capable of performing printing processing in which the server sequentially spools printing data received from a data processing apparatus via a predetermined communication medium in units of a job transfers the spooled printing data to the printing apparatus, and the transferred printing data is analyzed in units of a job includes a changing unit for changing the execution schedule of each spooled job so as to preferentially execute the job of spooled printing data capable of being subjected to printing by analyzing the error when it is detected that the printing apparatus has interrupted printing processing during processing of printing printing data spooled in the server. Hence, when the server can spool a plurality of jobs, and when notification of the generation of the error from the printing apparatus has been detected, if a job which does not influence the succeeding job is spooled by analyzing the error of the preceding error, succeeding jobs can be sequentially processed. As a result, efficiency in processing of each job spooled in the server can be greatly improved.

The configuration of a data processing program capable of being read in a printing system to which the printing control apparatus of the present invention can be applied will now be described with reference to the memory map shown in FIG. 22.

FIG. 22 is a diagram illustrating a memory map of a storage medium storing various data processing programs capable of being read in a printing system to which the data processing apparatus of the present invention can be applied.

Although not particularly illustrated, information for controlling a program group stored in the storage medium, such as version information, the author and the like, is also stored, and information depending on an OS at the program reading side, such as an icon for identifying and displaying a program, and the like, is, in some cases, also stored.

Data belonging to various programs is also controlled in the directory. Programs for installing various programs in a computer, programs to be defrosted when programs to be installed is compressed, and the like are, in some cases, also stored.

The functions shown in FIGS. 14, 16–19, and 21 in the fifth through eighth embodiments may be executed by a host computer according to a program installed from the outside. In such a case, the present invention is also applied when an information group including a program is supplied to the output device from a storage medium, such as a CD-ROM, a flash memory, an FD or the like, or from an external storage medium via a network.

The objects of the present invention may, of course, also be ahieved by supplying a system or an apparatus with a storage medium storing program codes of software for realizing the functions of the above-described emodiments, and reading and executing the program codes stored in the storage medium by means of a computer (or a CPU or an MPU) of the system or the apparatus.

In such a case, the program codes themselves read from the storage medium realize the functions of the above-described embodiments, so that the storage medium storing the program codes constitutes the present invention.

For example, a floppy disk, a hard disk, an optical disk, a magnetooptical disk, a CD-ROM, a CD-R, a magnetic tape, a nonvolatile memory card, a ROM, an EEPROM or the like may be used as the storage medium for supplying the program codes.

The present invention may, of course, be applied not only to a case in which the functions of the above-described embodiments are realized by executing program codes read by a computer, but also to a case in which an OS or the like operating in a computer executes a part or the entirety of actual processing, and the functions of the above-described embodiments are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

According to the above-described embodiments, when an error is generated in the second or succeeding page of a job, a state of awaiting the operator's operation is provided as in the conventional printing apparatus, so that the succeeding job is not preferentially processed.

When an error is generated in the first page, i.e., when no sheet is discharged, also, a state of awaiting the operator's operation is provided. However, this state is monitored by a timer, so that a time-out state is provided after the lapse of a predetermined time period. At that time, the succeeding job is preferentially processed by postponing processing of the concerned job.

In this case, the timing of resuming processing of the postponed job is (1) next to the job spooled at that time, (2) when all of spooled jobs have been processed, i.e., when the printer assumes a waiting state, or (3) when the cause of the error is released.

The environment of job execution of the third timing can be easily realized by storing the cause of the error when postponing the processing of the job due to the error, determining whether or not the cause is released every time the succeeding job has been processed, and resuming the processing of the concerned job if the result of the determination is affirmative.

The individual components shown in outline or designated by blocks in the drawings are all well-known in the job processing apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing control apparatus capable of communicating with a data processing apparatus via a predetermined communication medium, said printing control apparatus comprising:
    a detection unit for detecting an error for a printing job based on printing information received from the data processing apparatus;
    a time determination unit for determining whether a predetermined time period has elapsed since said detection unit detected the error; and
    a control unit for releasing a state of the detected error and cancelling the printing job when the predetermined time period has elapsed.

2. A printing control apparatus according to claim 1, wherein said control unit further transfers information indicating that the printing job is canceled to the data processing apparatus.

3. A printing control apparatus according to claim 1, said printing control apparatus further comprising a determination unit for determining a type of the error detected by said detection unit, wherein said control unit further transfers information indicating the type of the detected error determined by said determination unit to the data processing apparatus.

4. A printing control apparatus according to claim 1, further comprising a first setting unit for setting the predetermined time period.

5. A printing control apparatus according to claim 1, wherein said control unit does not cancel the printing job if a set value for releasing the state of the detected error in not ON.

6. A printing control apparatus capable of communicating with a plurality of data processing apparatuses via a predetermined communication medium, said printing control apparatus comprising:
    detection means for detecting an error for a printing job base d on printing information received from one of the data processing apparatuses;
    determination means for determining a type of the error detected by said detection means;
    releasing means for executing error releasing processing based on the type of the error determined by said determination means; and
    control means for cancelling the printing job after the error releasing processing by said releasing means.

7. A printing control apparatus according to claim 1, wherein said control means notifies one of the data processing apparatuses of information relating to the cancel of the printing job by identifying an apparatus where the printing information is to be notified.

8. A printing control apparatus according to claim 6, wherein said control means notifies one of the data processing apparatuses of the type of the error determined by said determination means by identifying an apparatus where the printing information is to be notified.

9. A printing control apparatus according to claim 6, further comprising first setting means for setting a time-out value for performing notification of the type of the error, wherein, when a time period after said detection means has detected the error exceeds the time-out value set by said first setting means, said control means notifies one of the data processing apparatus of the type of the error determined by said determination means by identifying an apparatus where the printing information is to be notified.

10. A printing control apparatus according to claim 6, further comprising second setting means for setting a time-out value for performing notification of cancel information, wherein, when a time period after said detection means has detected the error exceeds the time-out value set by said second setting means, said detection means notifies one of the data processing apparatuses of information relating to the cancel of the printing job by identifying an apparatus where the printing information is to be notified.

11. A method for controlling a printing control apparatus capable of communicating with a data processing apparatus via a predetermined communication medium, said method comprising the steps of:

detecting an error for a printing job based on printing information received from the data processing apparatus;

determining whether a predetermined time period has elapsed since the detection of the error in said detection step; and releasing a state of the detected error and cancelling the printing job when the predetermined time period has elapsed.

12. A method according to claim 11, wherein said releasing step further transfers information indicating that the printing job is canceled to the data processing apparatus.

13. A method according to claim 11, said method further comprising determining a type of the error detected in said detection step, wherein information indicating the type of the detected error is transferred in said releasing step to the data processing apparatus.

14. A method according to claim 11, further comprising setting the predetermined time period.

15. A method according to claim 11, wherein the printing job is not canceled in said releasing step if a set value for releasing the state of the detected error in not ON.

16. A computer-readable storage medium storing a computer-executable program, the computer-executable program comprising instructions for controlling a printing control apparatus capable of communicating with a data processing apparatus via a predetermined communication medium, the instructions comprising the steps of:

detecting an error for a printing job based on printing information received from the data processing apparatus;

determining whether a predetermined time period has elapsed since the detection of the error in said detection step; and releasing a state of the detected error and cancelling the printing job when the predetermined time period has elapsed.

17. A computer-readable storage medium according to claim 16, wherein said releasing step further transfers information indicating that the printing job is canceled to the data processing apparatus.

18. A computer-readable storage medium according to claim 16, the instructions further comprising a step of determining a type of the error detected in said detection step, wherein information indicating the type of the detected error is transferred in said releasing step to the data processing apparatus.

19. A computer-readable storage medium according to claim 16, the instructions further comprising a step of setting the predetermined time period.

20. A computer-readable storage medium according to claim 16, wherein the printing job is not canceled in said releasing step if a set value for releasing the state of the detected error in not ON.

\* \* \* \* \*

UNITED STATES PATENT AND TRADEMARK OFFICE
CERTIFICATE OF CORRECTION

PATENT NO. : 6,473,192 B1
DATED : October 29, 2002
INVENTOR(S) : Hideyuki Kidani et al.

It is certified that error appears in the above-identified patent and that said Letters Patent is hereby corrected as shown below:

Title page,
Item [56], References Cited, FOREIGN PATENT DOCUMENTS,
"363159077" should read -- 63-159077 --;
"410324044" should read -- 10-324044 --; and
"2000062292" should read -- 2000-62292 --.

Column 1,
Line 7, "paratus," should be deleted;
Line 51, "th e" should read -- the --; and
Line 53, "eset," should read -- set, --.

Column 2,
Line 10, "the," should read -- the --.

Column 3,
Line 19, "Information" should read -- information --; and
Line 30, "Value" should read -- value --.

Column 4,
Line 3, "Processing" should read -- processing --; and
Line 22, "cancelling," should read -- cancelling --.

Column 7,
Line 1, "generated" should read -- generated. --.

Column 12,
Line 56, "notified-Hence," should read -- notified. Hence, --.

Column 31, line 58 through Column 34, line 26,
Claims 1-20 should be deleted and substitute with the following Claims 1-20:

--1.     A printing control apparatus capable of communicating with a data processing apparatus via a predetermined communication medium, said printing control apparatus comprising:

a detection unit for detecting an error for a printing job based on printing information received from the data processing apparatus;

a time determination unit for determining whether a predetermined time period has elapsed since said detection unit detected the error; and a control unit for releasing a state of the detected error and cancelling the printing job when the predetermined time period has elapsed.

UNITED STATES PATENT AND TRADEMARK OFFICE
CERTIFICATE OF CORRECTION

| | |
|---|---|
| PATENT NO. : 6,473,192 B1 | |
| DATED : October 29, 2002 | |
| INVENTOR(S) : Hideyuki Kidani et al. | |

It is certified that error appears in the above-identified patent and that said Letters Patent is hereby corrected as shown below:

Column 31, line 58 through Column 34, line 26 (cont'd),

2. A printing control apparatus according to Claim 1, wherein said control unit further transfers information indicating that the printing job is canceled to the data processing apparatus.

3. A printing control apparatus according to Claim 1, said printing control apparatus further comprising a determination unit for determining a type of the error detected by said detection unit, wherein said control unit further transfers information indicating the type of the detected error determined by said determination unit to the data processing apparatus.

4. A printing control apparatus according to Claim 1, further comprising a first setting unit for setting the predetermined time period.

5. A printing control apparatus according to Claim 1, wherein said control unit does not cancel the printing job if a set value for releasing the state of the detected error in not ON.

6. A printing control apparatus capable of communicating with a plurality of data processing apparatuses via a predetermined communication medium, said printing control apparatus comprising:

a detection unit for detecting an error for a printing job based on printing information received from one of the plurality of data processing apparatuses;

a time determination unit for determining whether a predetermined time period has elapsed since said detection unit detected the error; and a control unit for releasing a state of the detected error and cancelling the printing job when the predetermined time period has elapsed.

7. A printing control apparatus according to Claim 6, wherein said control unit further identifies one of the plurality of data processing apparatuses from which the printing information was received and notifies the identified data processing apparatus of information relating to the cancellation of the printing job.

8. A printing control apparatus according to Claim 6, said printing control apparatus further comprising a determination unit for determining a type of the error detected by said detection unit, wherein said control unit further identifies one of the plurality of data processing apparatuses from which the printing information was received and notifies the identified data processing apparatus of the type of the detected error determined by said determination unit.

9. A printing control apparatus according to Claim 6, further comprising a first setting unit for setting the predetermined time period.

10. A printing control apparatus according to Claim 6, wherein said control unit does not cancel the printing job if a set value for releasing the state of the detected error in not ON.

UNITED STATES PATENT AND TRADEMARK OFFICE
CERTIFICATE OF CORRECTION

| | |
|---|---|
| PATENT NO. | : 6,473,192 B1 |
| DATED | : October 29, 2002 |
| INVENTOR(S) | : Hideyuki Kidani et al. |

It is certified that error appears in the above-identified patent and that said Letters Patent is hereby corrected as shown below:

Column 31, line 58 through Column 34, line 26 (cont'd),

11. A method for controlling a printing control apparatus capable of communicating with a data processing apparatus via a predetermined communication medium, said method comprising the steps of:

detecting an error for a printing job based on printing information received from the data processing apparatus;

determining whether a predetermined time period has elapsed since the detection of the error in said detection step; and releasing a state of the detected error and cancelling the printing job when the predetermined time period has elapsed.

12. A method according to Claim 11, wherein said releasing step further transfers information indicating that the printing job is canceled to the data processing apparatus.

13. A method according to Claim 11, said method further comprising determining a type of the error detected in said detection step, wherein information indicating the type of the detected error is transferred in said releasing step to the data processing apparatus.

14. A method according to Claim 11, further comprising setting the predetermined time period.

15. A method according to Claim 11, wherein the printing job is not canceled in said releasing step if a set value for releasing the state of the detected error in not ON.

16. A computer-readable storage medium storing a computer-executable program, the computer-executable program comprising instructions for controlling a printing control apparatus capable of communicating with a data processing apparatus via a predetermined communication medium, the instructions comprising the steps of:

detecting an error for a printing job based on printing information received from the data processing apparatus;

determining whether a predetermined time period has elapsed since the detection of the error in said detection step; and releasing a state of the detected error and cancelling the printing job when the predetermined time period has elapsed.

UNITED STATES PATENT AND TRADEMARK OFFICE
CERTIFICATE OF CORRECTION

PATENT NO. : 6,473,192 B1
DATED : October 29, 2002
INVENTOR(S) : Hideyuki Kidani et al.

It is certified that error appears in the above-identified patent and that said Letters Patent is hereby corrected as shown below:

<u>Column 31, line 58 through Column 34, line 26 (cont'd),</u>

17. A computer-readable storage medium according to Claim 16, wherein said releasing step further transfers information indicating that the printing job is canceled to the data processing apparatus.

18. A computer-readable storage medium according to Claim 16, the instructions further comprising a step of determining a type of the error detected in said detection step, wherein information indicating the type of the detected error is transferred in said releasing step to the data processing apparatus.

19. A computer-readable storage medium according to Claim 16, the instructions further comprising a step of setting the predetermined time period.

20. A computer-readable storage medium according to Claim 16, wherein the printing job is not canceled in said releasing step if a set value for releasing the state of the detected error in not ON.--

Signed and Sealed this

Twenty-sixth Day of July, 2005

JON W. DUDAS
*Director of the United States Patent and Trademark Office*